United States Patent
Goh et al.

(10) Patent No.: US 8,284,298 B2
(45) Date of Patent: Oct. 9, 2012

(54) LENS-INTERCHANGEABLE DIGITAL PHOTOGRAPHING APPARATUS AND METHOD FOR CONTROLLING THE SAME

(75) Inventors: Ji-hyun Goh, Seongnam-si (KR); Don-yub Cho, Suwon-si (KR); Jong-hwan Lee, Suwon-si (KR); Won-jung Kim, Cheonan-si (KR); Sung-ha Park, Seoul (KR); Sung-cheol Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/241,891

(22) Filed: Sep. 23, 2011

(65) Prior Publication Data
US 2012/0008016 A1 Jan. 12, 2012

Related U.S. Application Data

(63) Continuation of application No. 12/316,618, filed on Dec. 15, 2008, now Pat. No. 8,054,373.

(30) Foreign Application Priority Data

Dec. 21, 2007 (KR) .................. 10-2007-0135736
Mar. 14, 2008 (KR) .................. 10-2008-0023935

(51) Int. Cl.
*H04N 5/225* (2006.01)

(52) U.S. Cl. ......................... 348/360; 348/361

(58) Field of Classification Search .................. 348/360, 348/361
See application file for complete search history.

(56) References Cited

U.S. PATENT DOCUMENTS

| 6,339,680 | B1 | 1/2002 | Mauvais |
| 6,516,154 | B1 | 2/2003 | Parulski et al. |
| 6,526,234 | B1 | 2/2003 | Malloy Desormeaux |
| 6,643,457 | B2 | 11/2003 | Chen |
| 7,151,570 | B2 | 12/2006 | Kaneda |
| 8,054,373 | B2 * | 11/2011 | Goh et al. ............ 348/360 |
| 2007/0153101 | A1 * | 7/2007 | Chang et al. .......... 348/240.2 |
| 2007/0153301 | A1 * | 7/2007 | Chang et al. .......... 358/1.2 |

FOREIGN PATENT DOCUMENTS

JP 02005167653 A * 6/2005

OTHER PUBLICATIONS

Tamron Lens Simulator, available at http://www.tamron.eu on Apr. 24, 2008 (pp. 1-7).*

* cited by examiner

*Primary Examiner* — Rodney Fuller
(74) *Attorney, Agent, or Firm* — Drinker Biddle & Reath LLP

(57) ABSTRACT

A method of controlling a lens-interchangeable digital photographing apparatus including acquiring a temporary image using a first lens in response to a signal; producing additional temporary images that could be acquired were respective lenses used instead of the first lens, by processing the acquired temporary image; and displaying the temporary image and the additional temporary images on a display unit.

9 Claims, 16 Drawing Sheets

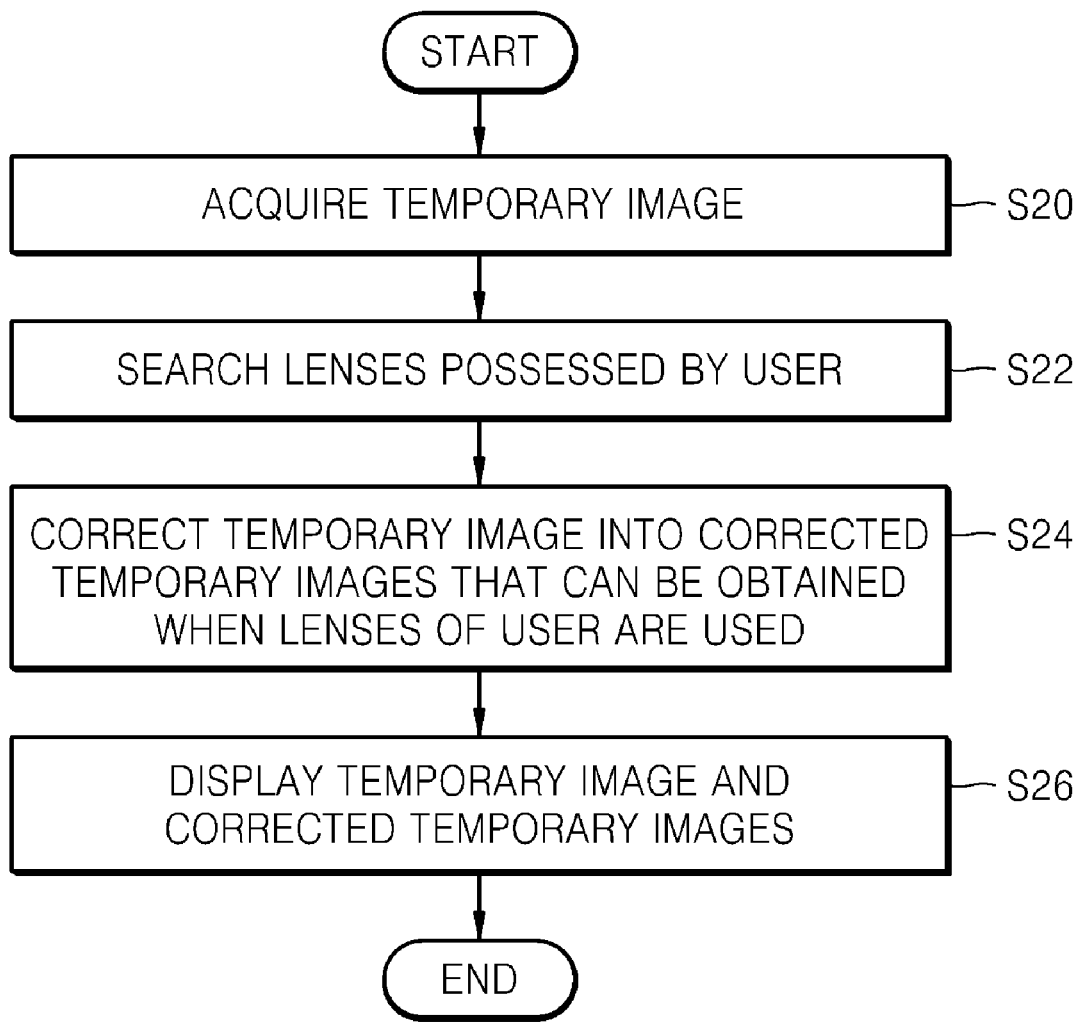

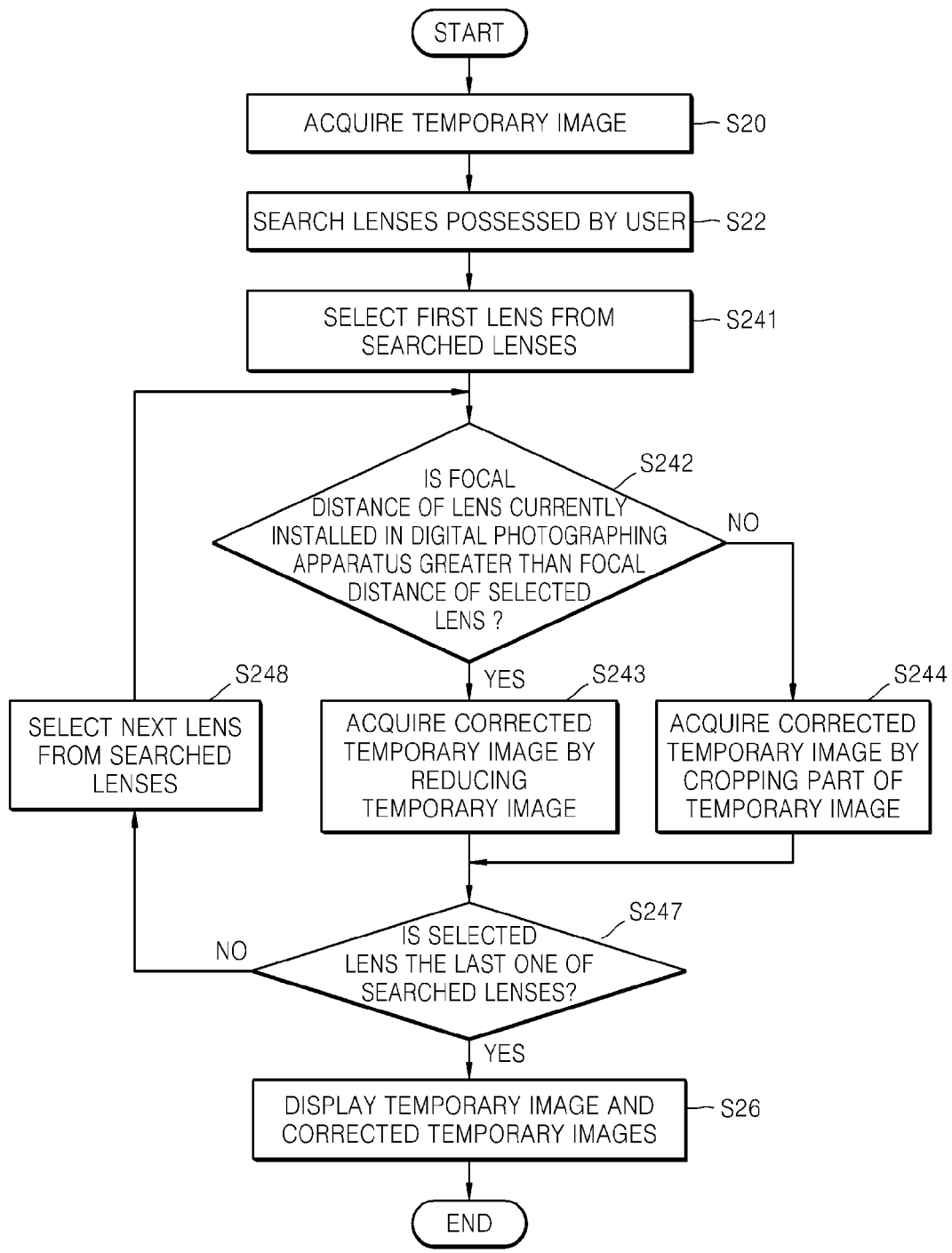

LENS-INTERCHANGEABLE DIGITAL PHOTOGRAPHING APPARATUS AND METHOD FOR CONTROLLING THE SAME

CROSS-REFERENCE TO RELATED PATENT APPLICATION

This application is a continuation application of U.S. patent application Ser. No. 12/316,618 (now U.S. Pat. No. 8,054,373), filed on Dec. 15, 2008, which claims the benefits of Korean Patent Application No. 10-2007-0135736, filed on Dec. 21, 2007, in the Korean Intellectual Property Office, and Korean Patent Application No. 10-2008-0023935, filed on Mar. 14, 2008, in the Korean Intellectual Property Office, the disclosures of which are incorporated herein in their entireties by reference.

BACKGROUND

The present invention relates to a digital photographing apparatus and a method of controlling the same, and more particularly, to a lens-interchangeable digital photographing apparatus that can employ suitable lenses according to photographing circumstances and a method of controlling the lens-interchangeable digital photographing apparatus.

General digital photographing apparatuses store image files obtained by photographing operations in a photographing mode in storage media, play back the image files stored in the storage media in a playback mode, and display images on display units. The image files obtained by the photographing operations may also be played back in the photographing mode.

Such digital photographing apparatuses are classified into lens-interchangeable digital photographing apparatuses, such as single lens reflex (SLR) digital photographing apparatuses, and fixed-lens digital photographing apparatuses. Conventional lens-interchangeable digital photographing apparatuses produce images providing different effects according to the characteristics of installed lenses, even when photographing an identical subject. Accordingly, images providing different effects can be obtained according to the selection of a lens made by a user. However, inexperienced users cannot efficiently utilize the above-described advantage of conventional lens-interchangeable digital photographing apparatuses. In other words, inexperienced users may install lenses inappropriate for given photographing circumstances by not figuring out which lens is suitable for each of the given photographing circumstances, thereby failing to obtain images having the effects intended by conventional lens-interchangeable digital photographing apparatuses.

SUMMARY

Various embodiments of the present invention provide a lens-interchangeable digital photographing apparatus that can employ suitable lenses according to photographing circumstances and a method of controlling the lens-interchangeable digital photographing apparatus.

According to an aspect of the present invention, there is provided a method of controlling a digital photographing apparatus, the method comprising: analyzing a photographing circumstance; determining whether a lens installed in the digital photographing apparatus is suitable for the photographing circumstance; searching for lenses suitable for the photographing circumstance if it is determined that the lens installed in the digital photographing apparatus is not suitable; and recommending the found lenses as suitable for the photographing circumstance by displaying the found lenses on a display unit.

The searching for suitable lenses may include searching for lenses suitable for the photographing circumstance from a list of lenses that is previously input by a user.

If it is determined that the lens installed in the digital photographing apparatus is not suitable, the searching for suitable lenses may include: searching lenses that a user possesses; and searching for lenses suitable for the photographing circumstance from the found lenses.

The digital photographing apparatus may include an information receiving unit, and the searching of the lenses possessed by the user may be achieved by acquiring information from information transmission units attached to the lenses of the user by using the information receiving unit of the digital photographing apparatus.

The searching for lenses suitable for the photographing circumstance may be performed in consideration of at least one of a situation of a subject and a distance between the digital photographing apparatus and the subject.

The analyzing of the photographing circumstance may be performed when a shutter of the digital photographing apparatus is in a half-shutter state.

According to another aspect of the present invention, there is provided a method of controlling a digital photographing apparatus, the method comprising: acquiring a temporary image in response to a signal from a user; searching lenses that the user possesses; acquiring corrected temporary images that can be acquired when each of the lenses of the user is used, by correcting the acquired temporary image; and displaying the temporary image and the corrected temporary images on a display unit.

The acquiring of the corrected temporary images may include: acquiring a corrected temporary image by cropping and magnifying a part of the temporary image, if a focal distance of each of the lenses of the user is greater than a focal distance of the lens used in the acquiring of the temporary image; and acquiring a corrected temporary image by reducing the temporary image, if the focal distance of each of the lenses of the user is less than the focal distance of the lens used in the acquiring of the temporary image.

In the acquiring of the corrected temporary image by reducing the temporary image, a corrected temporary image whose overall size is the same as the size of the temporary image acquired in response to the signal may be acquired by locating an image obtained by reducing the temporary image acquired in response to the signal in the center of the corrected temporary image and processing the residual area as a margin.

The searching of the lenses that the user possesses may comprise searching a list of lenses that is previously input by the user.

The digital photographing apparatus may include an information receiving unit, and the searching of the lenses possessed by the user may be achieved by acquiring information from information transmission units attached to the lenses of the user by using the information receiving unit of the digital photographing apparatus.

The acquiring of the temporary image in response to a signal may be performed when a shutter of the digital photographing apparatus is in a half-shutter state.

The acquiring of the corrected temporary images may include: acquiring a corrected temporary image by cropping and magnifying a residual part of the temporary image that remains after removing a part corresponding to a central subject from the temporary image and by combining the result of the cropping and magnification of the residual part with the part corresponding to the central subject in the temporary image, if the focal distance of each of the lenses of the user is greater than the focal distance of the lens used in the acquiring of the temporary image; and acquiring a corrected temporary image by reducing the residual part of the temporary image that remains after removing the part corresponding to the central subject from the temporary image and by combining the result of the reduction of the residual part with the part corresponding to the central subject in the temporary image, if the focal distance of each of the lenses of the user is less than the focal distance of the lens used in the acquiring of the temporary image.

According to another aspect of the present invention, there is provided a digital photographing apparatus comprising: a photographing circumstance analysis unit; a lens suitability determination unit determining whether a lens installed in the digital photographing apparatus is suitable for a photographing circumstance; a lens search unit searching for lenses suitable for a photographing circumstance; and a display unit, wherein, if the lens suitability determination unit determines that the installed lens is not suitable, lenses suitable for the photographing circumstance analyzed by the photographing circumstance analysis unit from among lenses searched by the lens search unit are displayed on the display unit to be recommended.

If the lens suitability determination unit determines that the installed lens is not suitable, the lens search unit may search for lenses suitable for the photographing circumstance from a list of lenses that is previously input by the user.

The lens search unit may include an information receiving unit in order to acquire information from information transmission units attached to the lenses possessed by the user.

The lens search unit may search for lenses suitable for the photographing circumstance in consideration of at least one of a situation of a subject and a distance between the digital photographing apparatus and the subject.

The photographing circumstance analysis unit may analyze the photographing circumstance when a shutter of the digital photographing apparatus is in a half-shutter state.

According to another aspect of the present invention, there is provided a digital photographing apparatus comprising: an image data acquiring unit acquiring image data or temporary image data from light received via a lens; a lens search unit searching lenses that a user possesses; a corrected temporary image data acquiring unit acquiring corrected temporary image data corresponding to a corrected temporary image that can be acquired using each of the lenses searched by the lens search unit, by correcting the temporary image data acquired by the image data acquiring unit; and a display unit.

If a focal distance of each of the lenses searched by the lens search unit is greater than a focal distance of the lens that is used when the image data acquiring unit acquires the temporary image data, the corrected temporary image acquiring unit may acquire the corrected temporary image data associated with the corrected temporary image obtained by cropping and magnifying a part of a temporary image corresponding to the temporary image data. If the focal distance of each of the lenses searched by the lens search unit is less than the focal distance of the lens that is used when the image data acquiring unit acquires the temporary image data, the corrected temporary image acquiring unit may acquire the corrected temporary image data associated with the corrected temporary image obtained by reducing a temporary image corresponding to the temporary image data.

The lens search unit may search a list of lenses that is previously input by the user.

The lens search unit may include an information receiving unit in order to acquire information from information transmission units attached to the lenses possessed by the user.

The image data acquiring unit may acquire the temporary image data when a shutter of the digital photographing apparatus is in a half-shutter state.

If the focal distance of each of the lenses searched by the lens search unit is greater than the focal distance of the lens used when the image data acquiring unit acquires the temporary image data, the corrected temporary image acquiring unit may acquire the corrected temporary image data associated with the corrected temporary image that is obtained by cropping and magnifying a residual part of a temporary image that remains after removing a part corresponding to a central subject from the temporary image corresponding to the temporary image data and by combining the result of the cropping and magnification of the residual part with the part corresponding to the central subject in the temporary image corresponding to the temporary image data. If the focal distance of each of the lenses searched by the lens search unit is less than the focal distance of the lens that is used when the image data acquiring unit may acquire the temporary image data, the corrected temporary image acquiring unit may acquire the corrected temporary image data associated with the corrected temporary image that is obtained by reducing the residual part of a temporary image that remains after removing the part corresponding to the central subject from the temporary image corresponding to the temporary image data and by combining the result of the reduction of the residual part with the part corresponding to the central subject in the temporary image corresponding to the temporary image data.

According to another aspect of the present invention, there is provided a digital photographing apparatus having a scene mode selection function, comprising a lens suitability determination unit determining whether a lens installed in the digital photographing apparatus is suitable for a selected scene mode.

If the lens suitability determination unit determines that the installed lens is not suitable, a notice of unsuitability of the installed lens may be displayed on a display unit.

The digital photographing apparatus may further include a lens search unit searching for lenses suitable for the selected scene mode. If the lens suitability determination unit determines that the installed lens is not suitable, the lens search unit may search for lenses suitable for the selected scene mode.

If the lens suitability determination unit determines that the installed lens is not suitable, lenses found by the lens search unit may be displayed on the display unit according to a selection of a user.

If the lens suitability determination unit determines that the installed lens is not suitable, the lens search unit may search for lenses suitable for the selected scene mode from lenses that are previously input by the user.

The lens search unit may include an information receiving unit which acquires information from an information transmitting unit attached to each of lenses possessed by the user.

According to another aspect of the present invention, there is provided a method of controlling a digital photographing apparatus, the method comprising: recognizing a scene mode selected from a plurality of scene modes of the digital photographing apparatus; and determining whether a lens installed in the digital photographing apparatus is suitable for the selected scene mode.

The method may further include displaying a notice of unsuitability of the installed lens on a display unit if it is determined that the installed lens is not suitable.

The method may further include searching for lenses suitable for the selected scene mode if it is determined that the installed lens is not suitable.

The method may further include displaying the found lenses suitable for the selected scene mode on the display unit according to a selection of a user.

The determining of whether the lens installed in the digital photographing apparatus is suitable for the selected scene mode may include searching for lenses suitable for the selected scene mode from lenses that are previously input by the user.

The searching for the lenses suitable for the selected scene mode may include: searching for the lenses possessed by the user; and searching for lenses suitable for the selected scene mode from among the lenses found in the searching for the lenses possessed by the user.

The digital photographing apparatus may include an information receiving unit; and the searching for the lenses possessed by the user may be achieved by acquiring information from an information transmitting unit attached to each of the lenses possessed by the user by using the information receiving unit of the digital photographing apparatus.

According to another aspect of the present invention, there is provided a recording medium having recorded a program for the method of controlling the digital photographing apparatus.

According to the digital photographing apparatus, the method of controlling the same, and the recording medium having stored therein a program for executing the method, a lens-interchangeable digital photographing apparatus can employ suitable lenses according to photographing circumstances.

BRIEF DESCRIPTION OF THE DRAWINGS

The above and other features and advantages of the present invention will become more apparent by describing in detail exemplary embodiments thereof with reference to the attached drawings in which:

FIG. 6 is a flowchart illustrating a method of controlling a digital photographing apparatus, according to another embodiment of the present invention;

FIG. 7 is a flowchart illustrating a method of controlling a digital photographing apparatus, according to another embodiment of the present invention;

DETAILED DESCRIPTION

The present invention will now be described more fully with reference to the accompanying drawings, in which exemplary embodiments of the invention are shown and described below.

Figure 1:
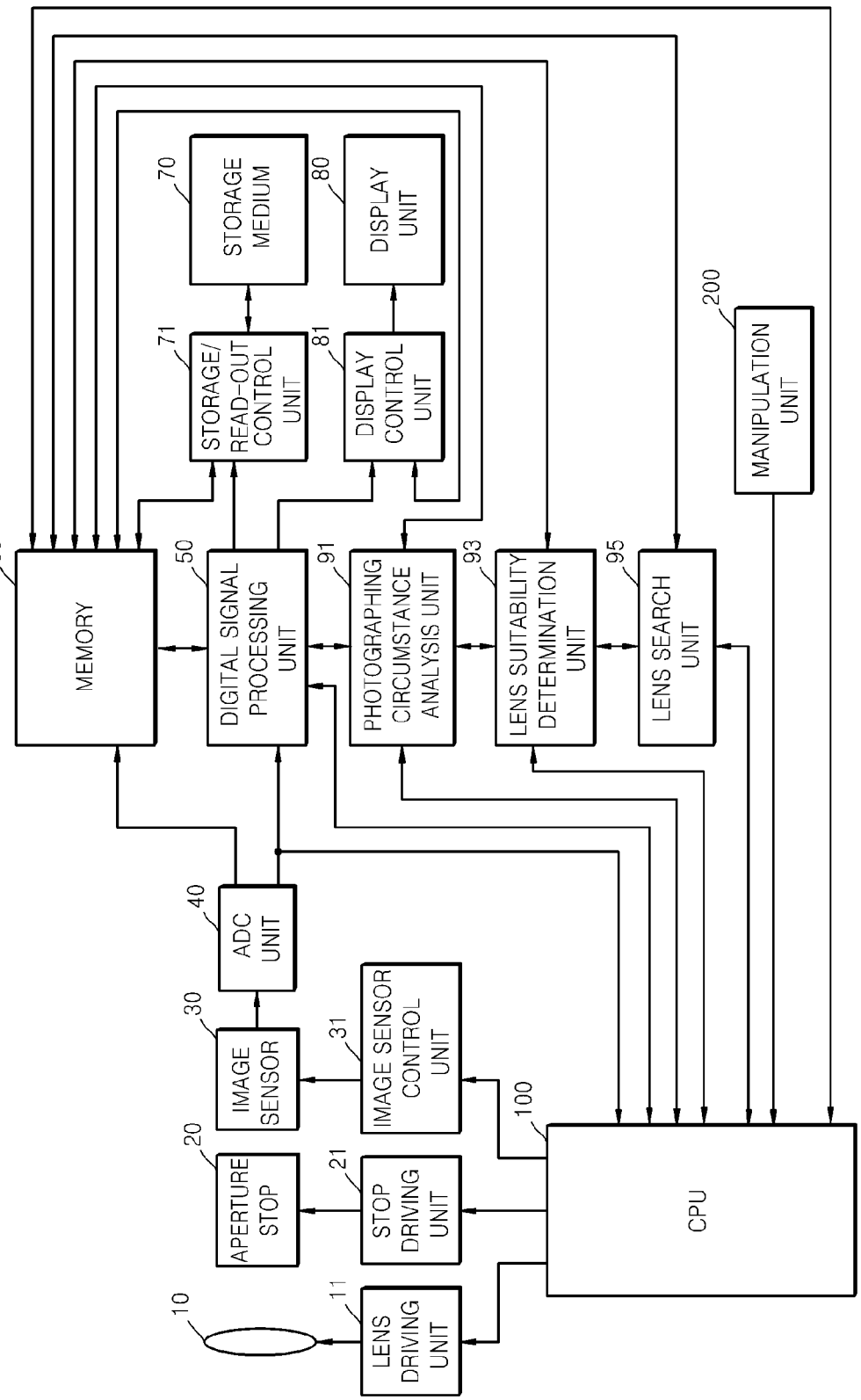
FIG. 1 is a block diagram of a digital photographing apparatus according to an embodiment of the present invention.

FIG. 1 is a block diagram of a digital photographing apparatus according to an embodiment of the present invention. The entire operation of the digital photographing apparatus according to the current embodiment is controlled by a central processing unit (CPU) 100. The digital photographing apparatus includes a manipulation unit 200 including, for example, keys through which a user generates electrical signals. The electrical signals from the manipulation unit 200 are transmitted to the CPU 100 so that the CPU 100 can control the digital photographing apparatus according to the electrical signals.

When the digital photographing apparatus is in a photographing mode, as an electrical signal from a user is applied to the CPU 100, the CPU 100 controls a lens driving unit 11, an aperture stop driving unit 21, and an image sensor control unit 31 according to the received electrical signal so that the location of a lens 10, the degree to which an aperture stop 20 is opened, and the sensitivity of an image sensor 30 are adjusted, respectively. The lens 10 may be interchanged by a user.

Although illustrated simply in FIG. 1, the lens 10 may be variously modified. For example, as described later with reference to FIG. 10, an interchangeable lens unit 10' may include an aperture stop 20, an aperture stop driving unit 21, a zooming lens 13, a lens location detection unit 14, a lens control unit 15, a focusing lens 16, and/or a focusing lens driving unit 17.

The image sensor 30 generates analog data associated with an image from received light. An analog-to-digital conversion (ADC) unit 40 converts the analog data output by the image sensor 30 into digital data. Moreover, the ADC unit 40 may not be needed according to the characteristics of the image sensor 30. Since the aperture stop 20 and the image sensor 30 generate the analog data associated with an image from the light received via the lens 10, at least one of the aperture stop 20 and the image sensor 30 may be referred to as an image data acquiring unit. However, the present invention is not limited to this configuration, and various modifications, such as, an example where at least one of the aperture stop 20, the image sensor 30, the ADC unit 40, and a digital signal processing unit 50 may be referred to as an image data acquiring unit, may be made.

The digital data from the ADC unit 40 may be transmitted to the digital signal processing unit 50 either via a memory 60 or without passing through the memory 60. In some cases, the digital data from the ADC unit 40 may also be transmitted to the CPU 100. The memory 60 includes a ROM, a RAM, or the like. The digital signal processing unit 50 may perform digital signal processing on the digital data from the ADC unit 40, such as gamma correction or white balance adjustment, in some cases.

The image data output from the digital signal processing unit 50 is transmitted to a display control unit 81 via the memory 60 or directly transmitted to the display control unit 81. The display control unit 81 controls a display unit 80 so that the image is displayed on the display unit 80. The image data output from the digital signal processing unit 50 is transmitted to a storage/read-out control unit 71 via the memory 60 or directly transmitted to the storage/read-out control unit 71. The storage/read-out control unit 71 stores the image data in a storage medium 70 either according to a signal from the user or automatically. The storage/read-out control unit 71 may also read out image data from image files stored in the storage medium 70 and transmits the image data to the display control unit 81 via the memory 60 or the other paths so that the image can be displayed on the display unit 80. The storage medium 70 may be either detachable or permanently fixed to the digital photographing apparatus.

The analog data generated from the light received by the image sensor 30 via the lens 10 may be image data or temporary image data. The temporary image data denotes not data associated with a large-sized image to be stored in the storage medium 70 but data associated with a temporary image to be displayed on the display unit 80 according to a signal from the user. Since a live view image such as a moving picture can be displayed on the display unit 80 by using data generated from light received by the image sensor 30 before photography, the temporary image may also denote a frame image of the live view image which is selected according to a signal from the user.

A photographing circumstance analysis unit 91 analyzes a circumstance in which photographing is performed by the digital photographing apparatus. For example, the photographing circumstance analysis unit 91 may analyze a distance between a subject and the digital photographing apparatus or an ambient lighting condition.

A lens suitability determination unit 93 determines whether a lens installed as the lens 10 in the digital photographing apparatus is suitable for the photographing circumstance analyzed by the photographing circumstance analysis unit 91.

A lens search unit 95 searches for lenses suitable for the photographing circumstance analyzed by the photographing circumstance analysis unit 91. In other words, when the lens suitability determination unit 93 determines that the currently installed lens is not suitable for the photographing circumstance analyzed by the photographing circumstance analysis unit 91, the lenses suitable for the photographing circumstance analyzed by the photographing circumstance analysis unit 91, which were found by the lens search unit 95, are recommended via the display unit 80.

Although it is illustrated in FIG. 1 that the photographing circumstance analysis unit 91, the lens suitability determination unit 93, and the lens search unit 95 are separated from the other components, at least one of them may be a part of any of the other components such as the CPU 100 or the digital signal processing unit 50.

Figure 2:
FIG. 2 is a conceptual diagram schematically illustrating an image obtained via a lens installed in the digital photographing apparatus illustrated in FIG. 1.

FIG. 2 is a conceptual diagram schematically illustrating a temporary image obtained via a lens installed in the digital photographing apparatus illustrated in FIG. 1. More specifically, FIG. 2 illustrates a temporary image obtained by photographing a person sitting on a sofa by using the digital photographing apparatus having a Schneider D-XENON 12~24 mm F4 lens installed therein.

The photographing circumstance analysis unit 91 analyzes the temporary image, and the lens suitability determination unit 93 determines whether the lens currently installed in the digital photographing apparatus is suitable for the photographing circumstance analyzed by the photographing circumstance analysis unit 91. The photographing circumstance analysis unit 91 may analyze a photographing circumstance when a shutter of the digital photographing apparatus is in a half-shutter state, or a photographing circumstance when the digital photographing apparatus includes a special button and a user clicks the special button.

When a temporary image as illustrated in FIG. 2 is acquired, the photographing circumstance analysis unit 91 analyzes whether a subject is a person, indoor and outdoor conditions, and/or a distance between the digital photographing apparatus and the subject. The lens suitability determination unit 93 determines whether the lens currently installed in the digital photographing apparatus is suitable, according to whether the subject is a person, the indoor and outdoor conditions, and/or the distance between the digital photographing apparatus and the subject. These factors have been analyzed by the photographing circumstance analysis unit 91.

In the case of a temporary image as illustrated in FIG. 2, the main subject is a person but the currently installed lens is suitable for landscape photography, and thus the lens suitability determination unit 93 may determine that the lens currently installed in the digital photographing apparatus is not suitable for the photographing circumstance. Accordingly, the lens search unit 95 searches for lenses suitable for the photographing circumstance analyzed by the photographing circumstance analysis unit 91. For example, in the case of a photographing circumstance as illustrated in FIG. 2, the lens search unit 95 may find a Sigma APO 70~200 mm F2.8 EX DG MACRO HSM, a Schneider FISH-EYE 10~17 mm F3.5~4.5 ED, a Schneider D-XENON Macro 100 mm F2.8, and a Pentax D FA 77 mm F1.8 Limited, as lenses suitable for the photographing circumstance (see the following Table 1).

Accordingly, the digital photographing apparatus displays the lenses suitable for the photographing circumstance on the display unit 80 so that even inexperienced users, who are unable to figure out what lens is suitable for each photographing circumstance, can effectively perform photographing by using a lens suitable for a given photographing circumstance.

The following Table 1 is an exemplary criterion that can be used when the lens suitability determination unit 93 and/or the lens search unit 95 determines the suitability or unsuitability of the lens currently installed in the digital photographing apparatus and/or searches for lenses suitable for a current photographing circumstance. The digital photographing apparatus can determine whether the photographing circumstance is indoor or outdoor according to the brightness of light incident upon the digital photographing apparatus, determine whether photography to be made by the digital photographing apparatus is portrait photography by using a commonly well-known face recognition method, and determine whether the photography to be made by the digital photographing apparatus is close-up photography according to the distance between the digital photographing apparatus and the subject.

The lenses listed in Table 1 are lenses that can be installed in the digital photographing apparatus. When the digital photographing apparatus is changed, the lenses listed in Table 1 may be accordingly changed. Furthermore, various modifications such as addition of new lenses developed in the future to the list of Table 1 may also be made.

TABLE 1

Exemplary Lenses Suitable for a Photographing Circumstance

| Photographing circumstance | Recommended lenses |
|---|---|
| Indoor | Schneider D-XENON 18~55 mm F3.5~5.6 AL |
| | Schneider D-XENON 16~45 mm F4 ED |
| | Schneider D-XENON 35 mm F2 |
| Landscape | Schneider D-XENON 18~55 mm F3.5~5.6 AL |
| | Schneider D-XENON 50~200 mm F4~5.6 ED |
| | Schneider D-XENON 12~24 mm F4 ED |
| | Schneider FISH-EYE 10~17 mm F3.5~4.5 ED |
| | Tamron AF 18~200 mm F3.5~6.3 XR Di II LD Aspherical (IF) Macro |
| | Sigma 18~200 mm F3.5~6.3 DC |
| Portrait | Sigma APO 70~200 mm F2.8 EX DG MACRO HSM |
| | Schneider FISH-EYE 10~17 mm F3.5~4.5 ED |
| | Schneider D-XENON Macro 100 mm F2.8 |
| | Pentax D FA 77 mm F1.8 Limited |
| Close-up photography | Tamron AF 18~200 mm F3.5~6.3 XR Di II LD Aspherical (IF) Macro |
| | Sigma 18~200 mm F3.5~6.3 DC |
| | Pentax D FA Macro 50 mm F2.8 |
| | Schneider D-XENON Macro 100 mm F2.8 |

A database suitable for each photographing circumstance is established on the basis of the focal distances, the numerical values of aperture stops, etc., of the various types of lenses shown in Table 1 so that the lens suitability determination unit 93 and/or the lens search unit 95 can use the databases when determining the suitability of the currently installed lens and/or searching for suitable lenses.

Meanwhile, lenses that a user possesses may have attached thereto information transmission units for transmitting data associated with the characteristics of the lenses, and the lens search unit 95 may include an information reception unit. Thus, the lens search unit 95 can acquire information from the information transmission units attached to the lenses of the user when searching for a lens suitable for the photographing circumstance analyzed by the photographing circumstance analysis unit 91. In this way, a suitable lens can be found.

For example, lenses that a user possesses may have RFID tags attached thereto that include data associated with the characteristics of the lenses. In this regard, the lens search unit 95 may include an RFID reader. Thus, when searching for a lens suitable for the photographing circumstance analyzed by the photographing circumstance analysis unit 91, the lens search unit 95 can acquire information from the RFID tags attached to the lenses of the user so as to find a suitable lens. In this case, the lens search unit 95 finds the most suitable lens for the photographing circumstance from among the lenses of the user, thereby minimizing inconvenience for the user.

Moreover, the user may be allowed to previously input a lens list to the digital photographing apparatus, and if the lens suitability determination unit 93 determines that the installed lens is not suitable, the lens search unit 95 may search for a lens suitable for the analyzed photographing circumstance from the previously input lenses. In this way, various modifications may be made. The previous inputting of the lens list by a user may be achieved by a user selecting at least some of the usable lenses included in a list stored in a memory of the digital photographing apparatus.

The present invention is not limited to the above-described example where the information transmission units are RFID tags and the information reception unit is an RFID reader. In this regard, information transfer between the lens and the lens search unit 95 may be performed via wireless communications, such as Zigbee, Bluetooth, or WiFi. In this way, various modifications may be made. In embodiments and modified examples to be described later, for convenience' sake, an information transmission unit is an RFID tag and an information reception unit is an RFID reader.

Figure 3:
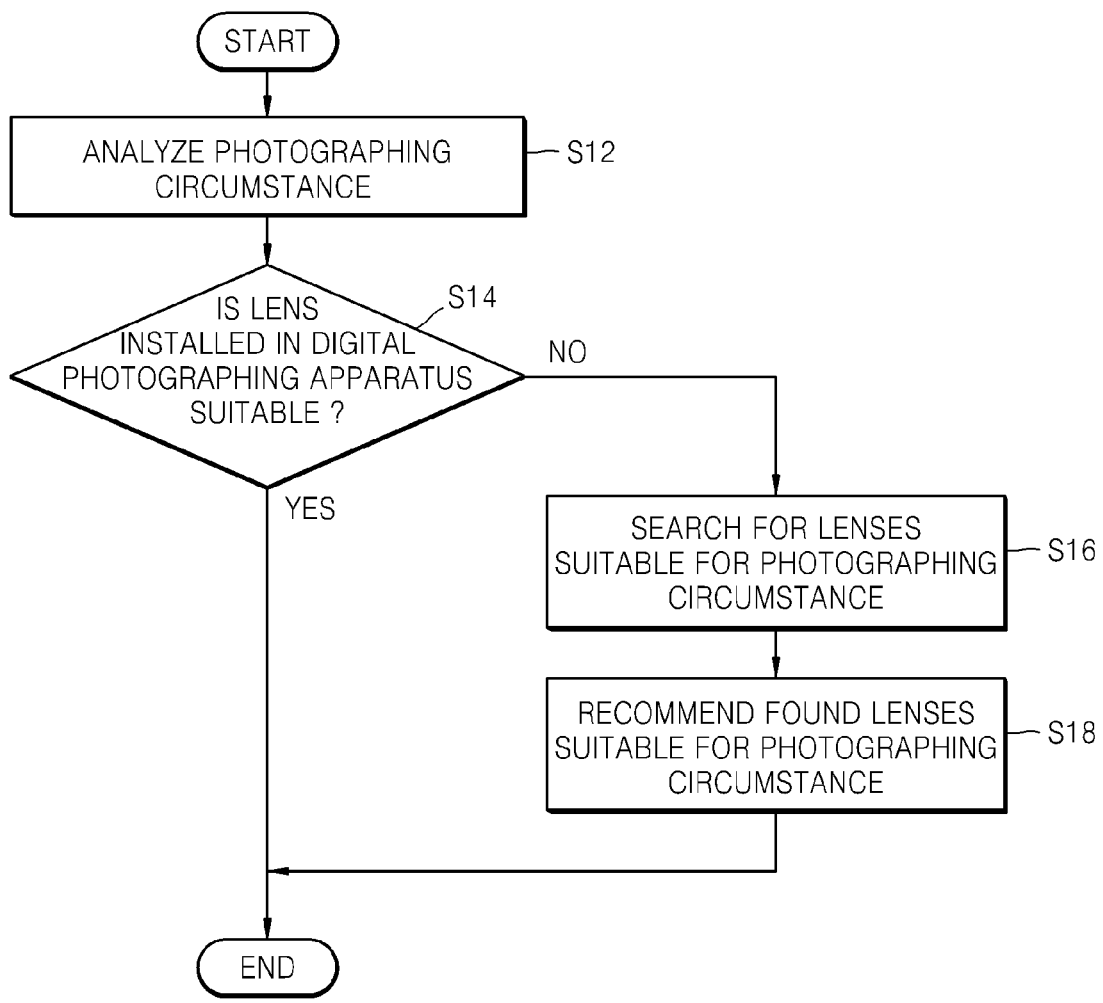
FIG. 3 is a flowchart illustrating a method of controlling a digital photographing apparatus, according to another embodiment of the present invention.

FIG. 3 is a flowchart illustrating a method of controlling a digital photographing apparatus, according to another embodiment of the present invention.

Referring to FIG. 3, first, a photographing circumstance is analyzed in operation S12. Then, it is determined whether a lens installed in the digital photographing apparatus is suitable, in operation S14. The operation S12 of analyzing the photographing circumstance may be performed when a shutter of the digital photographing apparatus is in a half-shutter state. If it is determined in operation S14 that the installed lens is not suitable, lenses suitable for the photographing circumstance are searched for in operation S16, and the found lenses suitable for the photographing circumstance are displayed on a display unit and recommended in operation S18. Through this process, even inexperienced users are able to take a picture by using the most suitable lens for a current photographing circumstance. The recommendation of lenses found to be suitable for a photographing circumstance through a display unit may be achieved by displaying images of the suitable lenses on the display unit, by displaying the focal distances of and the minimum numerical values of aperture stops of the suitable lenses on the display unit, or by displaying specific names of the suitable lenses on the display unit if the lenses are given specific names.

The operation S16 of searching for the lenses suitable for the photographing circumstance may be an operation of searching for lenses suitable for the photographing circumstance from lenses that have been previously input by a user. Alternatively, the digital photographing apparatus may include an RFID reader, and the operation S16 of searching for the lenses suitable for the photographing circumstance may be an operation of searching for lenses suitable for the photographing circumstance by acquiring information from RFID tags attached to lenses possessed by a user by using the RFID reader of the digital photographing apparatus.

In addition, the operation S16 of searching for the lenses suitable for the photographing circumstance may include the sub-operations of searching the lenses possessed by the user and finding lenses suitable for the photographing circumstance from the searched lenses. The operation S14 of determining whether the installed lens is suitable and/or the operation S16 of searching for the lenses suitable for the photographing circumstance may be performed in consideration of the situation of a subject, a distance between the digital photographing apparatus and the subject, and other factors. For example, the operation S14 and/or the operation S16 may be operations of performing a determination and/or search by using such a criterion as illustrated in Table 1.

Figure 4:
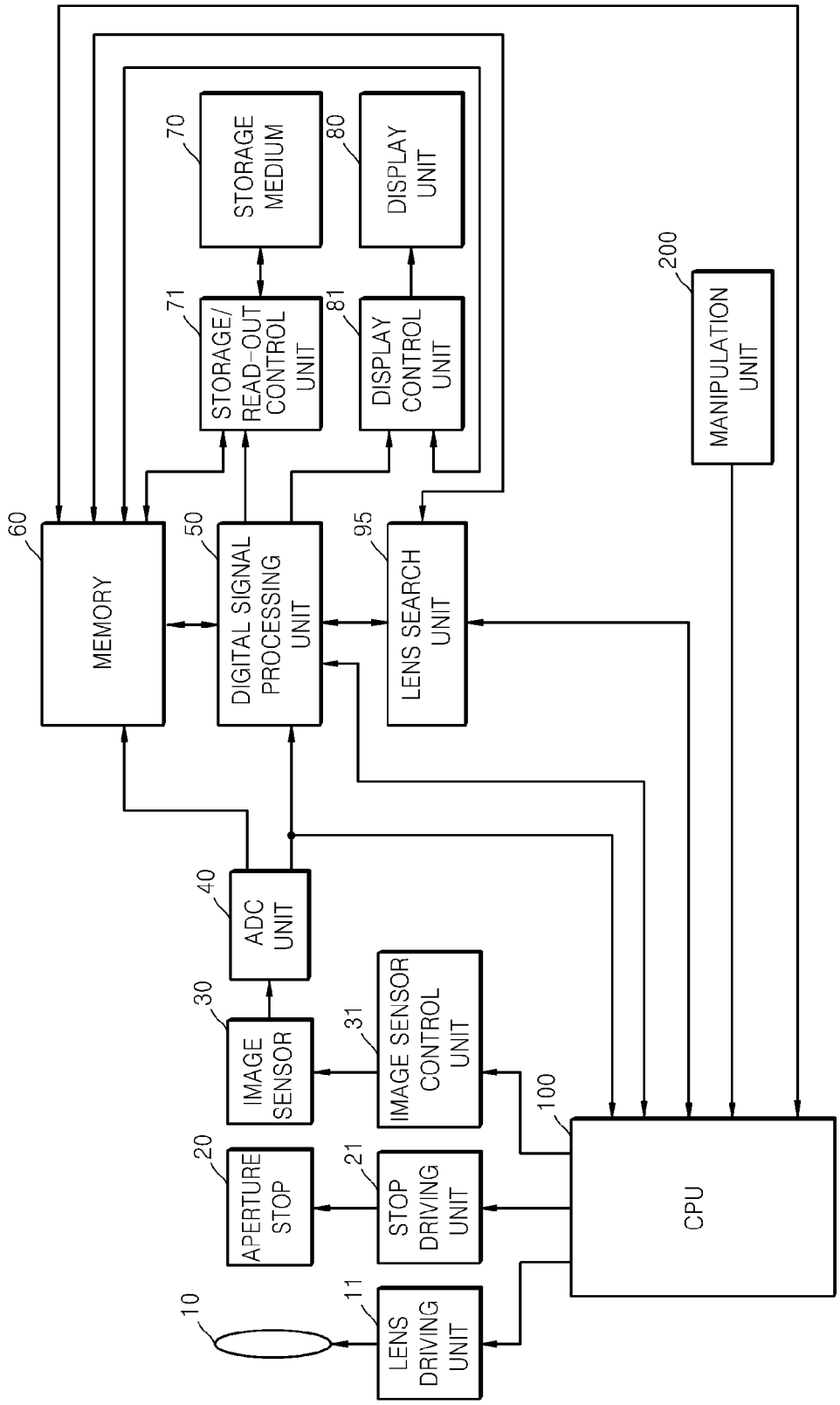
FIG. 4 is a block diagram of a digital photographing apparatus according to another embodiment of the present invention.

FIG. 4 is a block diagram of a digital photographing apparatus according to another embodiment of the present invention. Like elements in the digital photographing apparatuses of FIGS. 1 and 4 are referred to using the same reference numerals. In contrast with the digital photographing apparatus of FIG. 1, the digital photographing apparatus according to the current embodiment does not include the photographing circumstance analysis unit 91 and the lens suitability determination unit 93 and only includes the lens search unit 95.

As described above, since the aperture stop 20 and the image sensor 30 generate the analog data associated with an image from the light received via the lens 10, at least one of the aperture stop 20 and the image sensor 30 may be referred to as an image data acquiring unit. However, the present invention is not limited to this configuration, and various modifications, such as a case where at least one of the aperture stop 20, the image sensor 30, the ADC unit 40, and the digital signal processing unit 50 may be referred to an image data acquiring unit, may be made. This image data acquiring unit acquires image data or temporary image data from the light received via the lens 10. The image data acquiring unit may acquire temporary image data when a shutter of the digital photographing apparatus is in a half-shutter state The lens search unit 95 searches the lenses possessed by a user. Although illustrated in FIG. 4 that the lens search unit 95 is separate from the other components, this is only one embodiment. In this regard various other modifications, such as a case where the lens search unit 95 is a part of the CPU 100 or the digital signal processing unit 50, may be made.

The digital photographing apparatus according to the current embodiment includes a corrected temporary image data acquiring unit (not shown). Although assumed in FIG. 4 that the corrected temporary image data acquiring unit is a part of the digital signal processing unit 50, the corrected temporary image data acquiring unit may be an independent component, or may be a part of the CPU 100.

In this way, various modifications may be made. The corrected temporary image data acquiring unit corrects a temporary image acquired by the image data acquiring unit and acquires data associated with the corrected temporary image. The corrected temporary image denotes a temporary image that can be acquired when temporary images are obtained not by using a lens currently installed in the digital photographing apparatus but by using the lenses found by the lens search unit 95. In other words, the corrected temporary image data acquiring unit corrects a temporary image obtained by the currently installed lens and thus acquires data associated with a corrected temporary image which is a temporary image that can be obtained when any of the lenses possessed by the user other than the installed lens is installed.

Figure 5A:
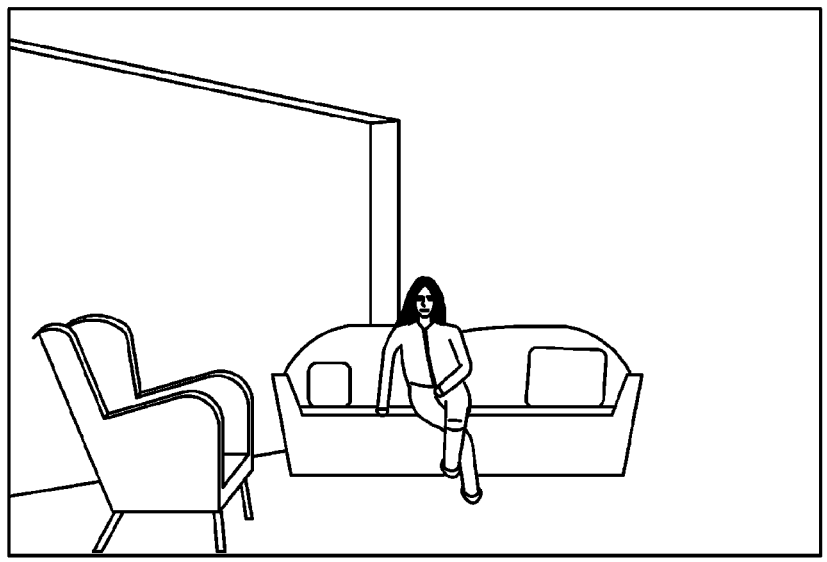
FIGS. 5A through 5D are conceptual diagrams for describing an operation of the digital photographing apparatus illustrated in FIG. 4, according to an embodiment of the present invention.
Figure 5B:
Figure 5C:
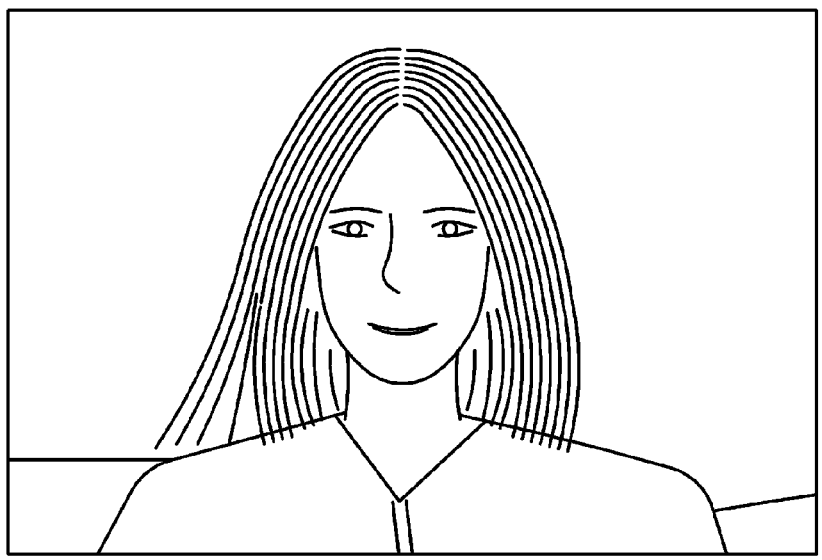

FIGS. 5A through 5D are conceptual diagrams for describing an operation of the digital photographing apparatus illustrated in FIG. 4, according to an embodiment of the present invention. For example, if a lens with a focal distance of 24 mm is installed in the digital photographing apparatus of FIG. 4 so as to obtain a temporary image as illustrated in FIG. 5A and the lens search unit 95 finds a lens with a focal distance of 70 mm and a lens with a focal distance of 200 mm, the corrected temporary image data acquiring unit acquires data associated with corrected temporary images as illustrated in FIGS. 5B and 5C.

The corrected temporary image of FIG. 5B is an image obtained by cropping and magnifying a part of the temporary image of FIG. 5A. The corrected temporary image of FIG. 5C is an image obtained by cropping and magnifying a part of the temporary image of FIG. 5A, which is smaller than the cropped and magnified part in FIG. 5B. These corrected temporary images may be deemed as images obtained by cropping and magnifying a part of the temporary image of FIG. 5A according to the focal distances of the lenses found by the lens search unit 95. In other words, the corrected temporary image of FIG. 5B can be obtained when the lens with the focal distance of 24 mm currently installed in the digital photographing apparatus is interchanged by the lens with the focal distance of 70 mm.

The corrected temporary image of FIG. 5C can be obtained when the lens with the focal distance of 24 mm currently installed in the digital photographing apparatus is interchanged by the lens with the focal distance of 200 mm. As described above, if the focal distances of the lenses found by the lens search unit 95 are greater than the focal distance of a lens used when the image data acquiring unit acquires temporary image data, the corrected temporary image data acquiring unit acquires corrected temporary image data associated with a corrected temporary image obtained by cropping a part of a temporary image corresponding to the temporary image data.

Figure 5D:
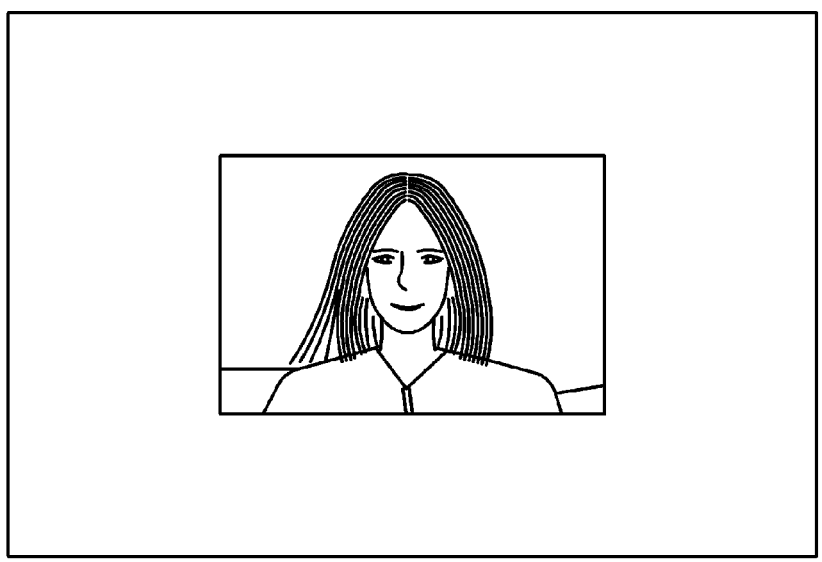

On the other hand, if a lens with a focal distance of 200 mm is installed in the digital photographing apparatus of FIG. 4 so as to obtain a temporary image as illustrated in FIG. 5C and the lens search unit 95 finds a lens with a focal distance of 70 mm, the corrected temporary image data acquiring unit acquires data associated with a corrected temporary image as illustrated in FIG. 5D. In other words, if the focal distances of the lenses found by the lens search unit 95 are less than the focal distance of a lens used when the image data acquiring unit acquires temporary image data, the corrected temporary image data acquiring unit acquires corrected temporary image data associated with a corrected temporary image obtained by reducing a temporary image corresponding to the temporary image data. A residual space remaining due to the reduction of the temporary image may be left as a blank space.

Lenses that a user possesses may have RFID tags attached thereto that include data associated with the characteristics of the lenses, and accordingly the lens search unit 95 may include an RFID reader. Thus, when searching the lenses of the user, the lens search unit 95 may acquire information from the RFID tags attached to the lenses of the user so as to find suitable lenses. However, the present invention is not limited to this configuration, and various modifications, such as a case where a user is allowed to previously input a lens list to the digital photographing apparatus and thus the lens search unit 95 searches the previously input lenses, may be made.

As described above, the digital photographing apparatus according to the current embodiment may acquire temporary image data corresponding to an image that can be obtained when a subject is photographed using the currently installed lens, and corrected temporary image data corresponding to an image that can be obtained when the subject is photographed using one of the lenses of a user that interchanges the currently installed lens, and display the temporary image data and the corrected temporary image data on a display unit. Thus, the user can determine which lens is most suitable for photographing the subject, thereby minimizing the inconvenience of lens selection.

FIG. 6 is a flowchart illustrating a method of controlling a digital photographing apparatus, according to another embodiment of the present invention. Referring to FIG. 6, in operation S20, a temporary image is acquired in response to a signal from a user. In operation S22, lenses possessed by the user are searched. In operation S24, the temporary image acquired in operation S20 is changed to corrected temporary images that can be obtained when the lenses of the user are used. In operation S26, the temporary image and the corrected temporary images are displayed on a display unit.

The user's signal for initiating operation S20 may be any of a plurality of signals obtained according to various methods. For example, when the shutter of the digital photographing apparatus is in a half-shutter state, the temporary image may be acquired. Alternatively, when a button included in the digital photographing apparatus is clicked, the temporary image may be acquired. Operation S22 may comprise an operation of searching for lenses suitable for a photographing circumstance from a lens list previously input by the user. On the other hand, if the digital photographing apparatus includes an RFID reader, operation S22 may comprise an operation of searching for suitable lenses by acquiring information from RFID tags attached to the lenses possessed by the user by using the RFID reader of the digital photographing apparatus.

As described above, in the digital photographing apparatus controlling method according to the current embodiment, the user can determine which lens is most suitable for photographing the subject, thereby minimizing the inconvenience of lens selection.

FIG. 7 is a flowchart illustrating a method of controlling a digital photographing apparatus, according to another embodiment of the present invention. The digital photographing apparatus controlling method according to the current embodiment provides a concrete process of acquiring a corrected temporary image by correcting a temporary image.

Referring to FIG. 7, first, a temporary image is acquired in operation S20. Then, in operation S22, lenses possessed by a user are searched. Next, in operation S241, a first lens is selected from the searched lenses. Thereafter, in operation S242, it is determined whether a focal distance of the first lens is greater than that of a lens currently installed in the digital photographing apparatus. If the focal distance of the selected first lens is greater than that of the lens currently installed in the digital photographing apparatus, a corrected temporary image is acquired by cropping a part of the temporary image acquired in operation S20, in operation S244.

On the other hand, if the focal distance of the first lens is less than that of the lens currently installed in the digital photographing apparatus, a corrected temporary image is acquired by reducing the temporary image acquired in operation S20, in operation S243. A residual space remaining due to the reduction of the temporary image in operation S243 may be left as a margin in the corrected temporary image. In other words, an image obtained by reducing the temporary image in operation S243 is located in the center of the corrected temporary image, and the residual area is processed as a margin.

Thus, the overall size of the corrected temporary image may be the same as the size of the temporary image acquired in operation S20. Thereafter, in operation S247, it is determined whether the selected first lens is the last of the lenses searched in operation S22. If it is determined in operation S247 that the selected lens is not the last lens, the next lens, that is, a second lens, is selected from the lenses searched in operation S22, in operation S248. Then, operation S242 is performed again. On the other hand, if it is determined in operation S247 that the selected first lens is the last lens, the temporary image and corrected temporary images are displayed on a display unit, in operation S26.

The digital photographing apparatus illustrated in FIG. 4 may be modified as follows. The modified digital photographing apparatus will now be described with reference to FIGS. 8A through 8F, which are conceptual diagrams for describing another operation of the digital photographing apparatus illustrated in FIG. 4.

Figure 8A:
FIGS. 8A through 8F are conceptual diagrams for describing another operation of the digital photographing apparatus illustrated in FIG. 4.
Figure 8B:
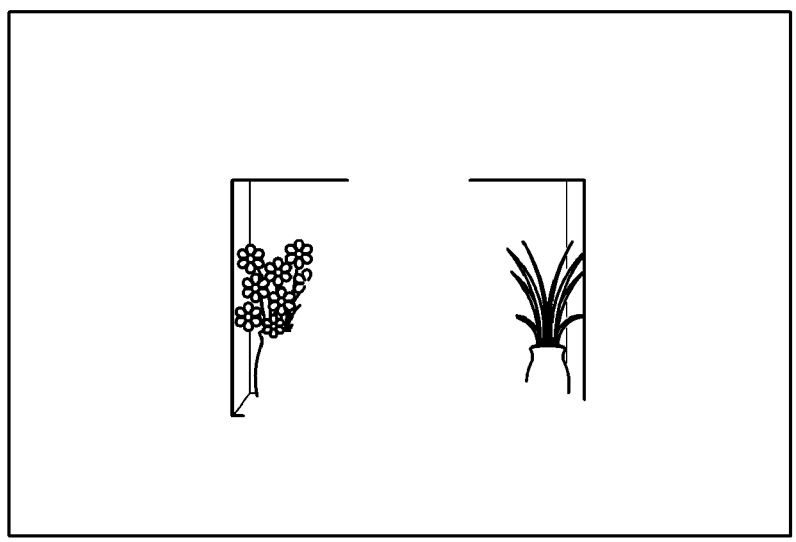
Figure 8C:
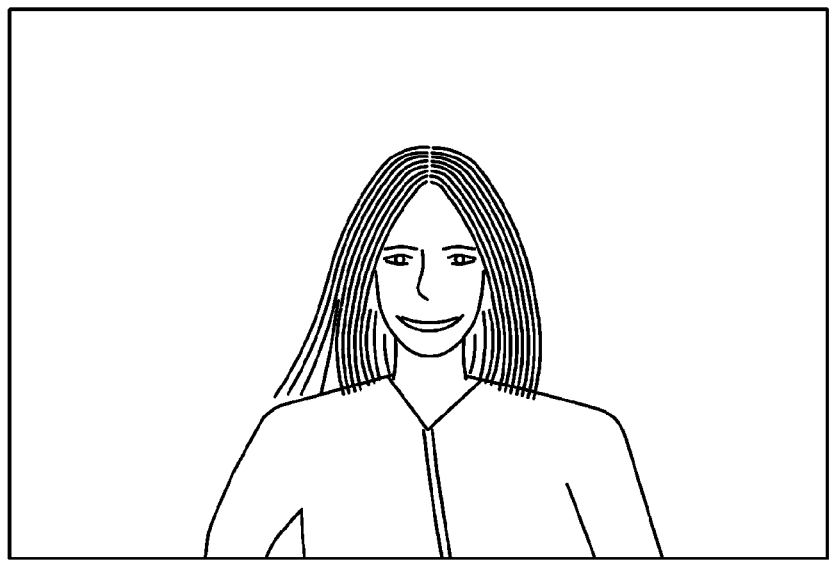
Figure 8D:
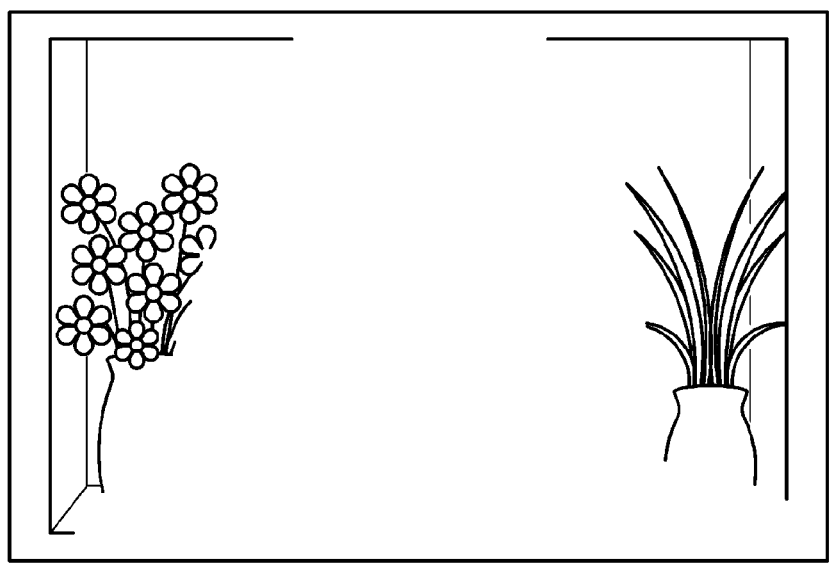
Figure 8E:

For example, if the digital photographing apparatus has a lens with a focal distance of 24 mm installed therein and thus obtains a temporary image as illustrated in FIG. 8A and the lens search unit 95 finds a lens with a focal distance of 70 mm which is greater than that of the lens installed in the digital photographing apparatus, a corrected temporary image data acquiring unit acquires data associated with a corrected temporary image as illustrated in FIG. 8E. The corrected temporary image as illustrated in FIG. 8E is a temporary image that can be obtained when the digital photographing apparatus moves and takes a picture so that a central subject in a temporary image obtained when photography is performed using the found lens with the focal distance of 70 mm newly installed in the digital photographing apparatus has the same size as that of a central subject in a temporary image obtained when photography is performed using the lens with the focal distance of 24 mm currently installed in the digital photographing apparatus.

In order to acquire data associated with the corrected temporary image as illustrated in FIG. 8E, first, an image corresponding to a residual part of the temporary image of FIG. 8A remaining after removing a part corresponding to a central subject from the temporary image is obtained as illustrated in FIG. 8B, and an image corresponding to the part corresponding to the central subject is obtained as illustrated in FIG. 8C. Then, the image of FIG. 8B is cropped and magnified as illustrated in FIG. 8D, and a result of the cropping and magnification is then combined with the image of FIG. 8C. In this way, the corrected temporary image of FIG. 8E is acquired. FIG. 8D illustrates an image obtained by simply cropping and magnifying the residual part remaining after removing the part corresponding to the central subject from the temporary image illustrated in FIG. 8A. However, on the assumption that, in contrast with FIG. 8D, data of pixels in an area where the central subject exists is the same as or similar to data of the pixels around the area where the central subject exists, data processing may be performed so that no blank spaces exist in the image illustrated in FIG. 8D. The part corresponding to the central subject can be ascertained in such a way as described above.

Although FIGS. 8A through 8E deal with a case where the lens search unit 95 finds a lens with a focal distance which is greater than that of the lens currently installed in the digital photographing apparatus, the method illustrated in FIGS. 8A through 8E can be similarly applied to even a case where the lens search unit 95 finds a lens with a focal distance less than that of the lens installed in the digital photographing apparatus. In other words, if the focal distance of the lens found by the lens search unit 95 is less than that of the lens used when the image data acquiring unit acquires the temporary image data, a reduced image may be obtained by reducing a residual part of a temporary image remaining after removing a part corresponding to a central subject from the temporary image and the part corresponding to the central subject in the temporary image may be combined with the reduced image. Moreover, when the reduced image is obtained, a part of the image outside the residual part may be processed as a margin.

Figure 8F:
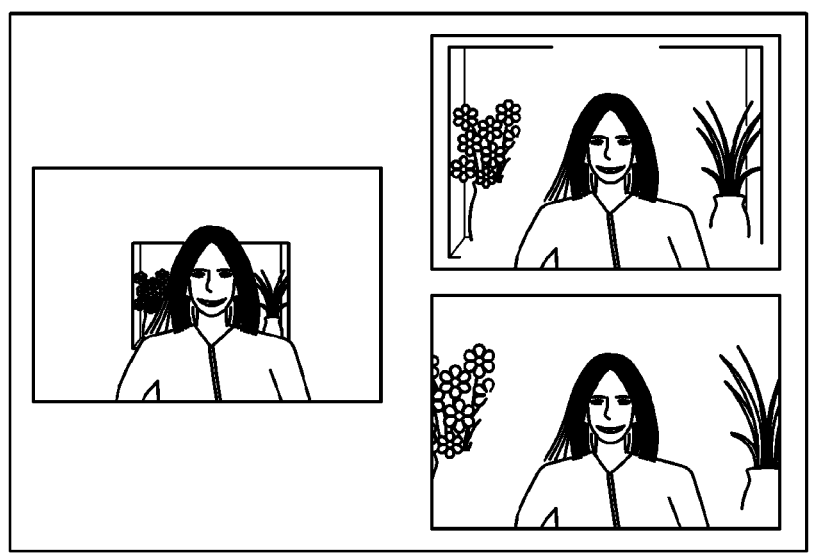

FIG. 8F deals with a case where the digital photographing apparatus having the lens with a focal distance of 24 mm installed therein obtains a temporary image as illustrated in FIG. 8A, and the lens search unit 95 finds lenses with focal distances of 70 mm and 200 mm which are greater than that of the lens installed in the digital photographing apparatus. Referring to FIG. 8F, a temporary image acquired via the lens with the 24 mm focal distance is displayed on the left side of a display unit, a corrected temporary image acquired when the lens with the 70 mm focal distance is used is displayed on the right top side thereof, and a corrected temporary image acquired when the lens with the 200 mm focal distance is used is displayed on the right bottom side thereof. However, the present invention is not limited to the above configuration, and various modifications, such as the display of the temporary image and the corrected temporary images together with the focal distances of the used lenses, may be made.

As described above, the digital photographing apparatus according to the current embodiment displays different images on the display unit 80 that are acquired when different lenses are used under a circumstance where the size of the central subject should be consistent. Therefore, users can effectively and easily select suitable lenses.

Figure 9:
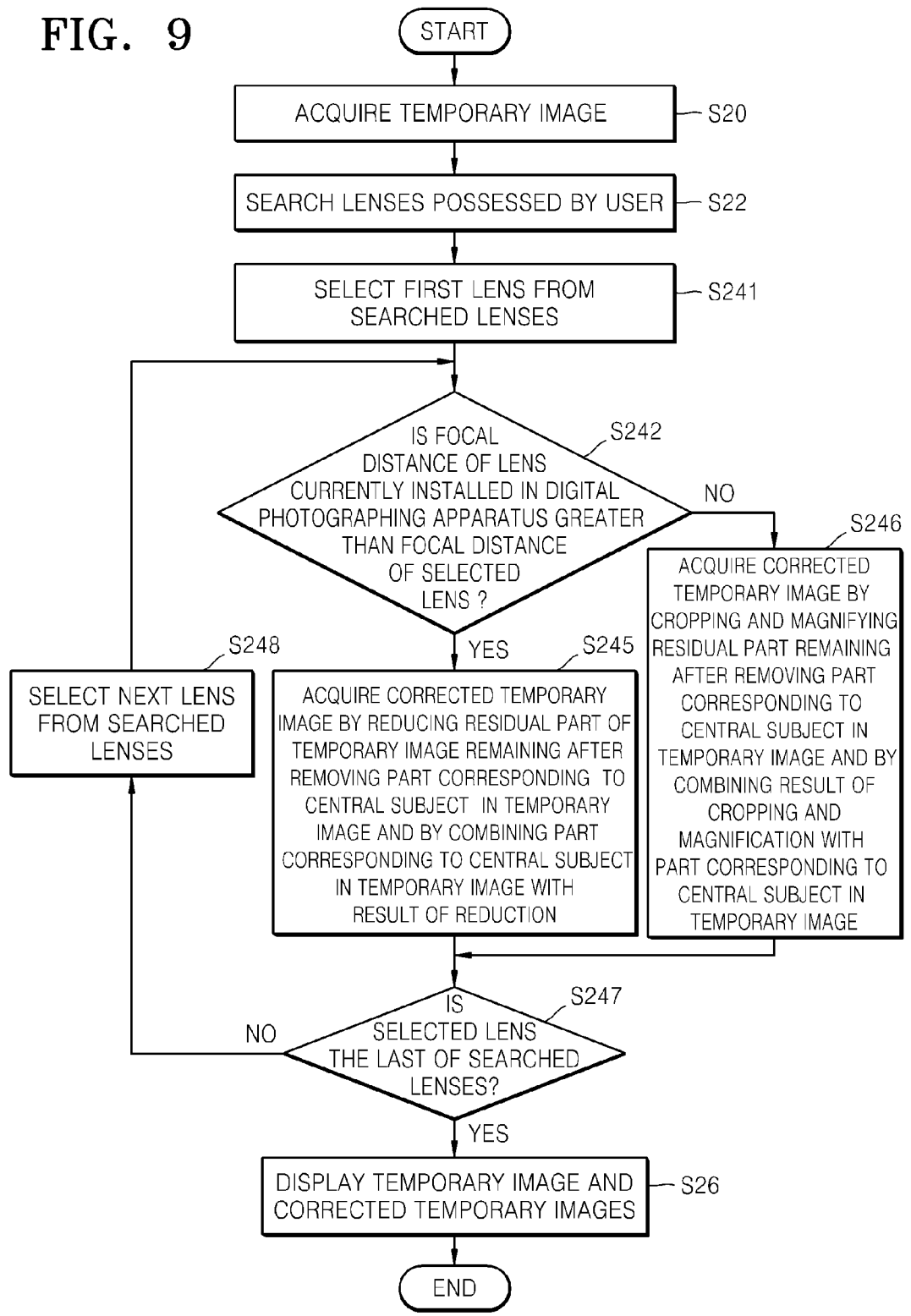
FIG. 9 is a flowchart illustrating a method of controlling a digital photographing apparatus, according to another embodiment of the present invention.

FIG. 9 is a flowchart illustrating a method of controlling a digital photographing apparatus, according to another embodiment of the present invention. The method of FIG. 9 is a modified version of the method illustrated in FIG. 7.

Referring to FIG. 9, first, the temporary image is acquired in operation S20. Then, in operation S22, the lenses possessed by the user are searched. Next, in operation S241, the first lens is selected from the searched lenses. If the focal distance of the selected first lens is greater than that of the lens currently installed in the digital photographing apparatus, a corrected temporary image is acquired by cropping and magnifying a residual part of the temporary image acquired in operation S20 that remains after removing a part corresponding to a central subject in the temporary image and by combining the result of the cropping and magnification with the part corresponding to the central subject in the temporary image, in operation S246.

On the other hand, if the focal distance of the selected lens is less than that of the lens currently installed in the digital photographing apparatus, a corrected temporary image is acquired by reducing the residual part remaining after removing the part corresponding to the central subject in the temporary image and by combining the part corresponding to the central subject in the temporary image with the result of the reduction, in operation S245. A residual space remaining due to the reduction of the temporary image may be left as a margin in the corrected temporary image. In other words, an image obtained by reducing the residual part remaining after removing the part corresponding to the central subject in the temporary image is located in the center of the corrected temporary image, and the residual area is processed as a margin.

Thus, the overall size of the corrected temporary image may be the same as the size of the temporary image acquired in operation S20. Thereafter, in operation S247, it is determined whether the selected first lens is the last of the lenses searched in operation S22. If it is determined in operation S247 that the selected first lens is not the last lens, the next lens, that is, a second lens, is selected from the lenses searched in operation S22, in operation S248. Then, operation S242 is performed again. On the other hand, if it is determined in operation S247 that the selected first lens is the last lens, the temporary image and corrected temporary images are displayed on a display unit, in operation S26.

Figure 10:
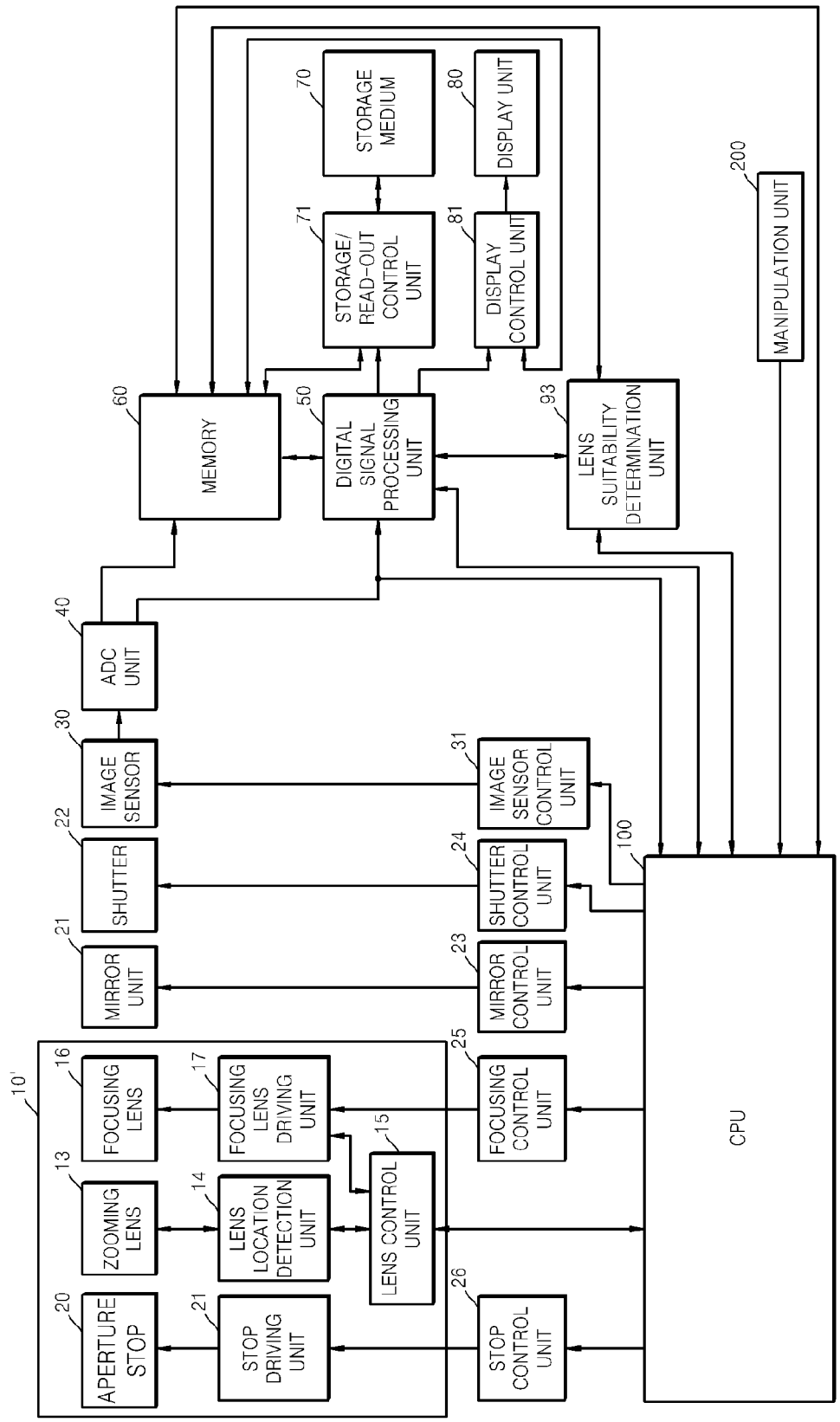
FIG. 10 is a block diagram of a digital photographing apparatus according to another embodiment of the present invention.

FIG. 10 is a block diagram of a digital photographing apparatus according to another embodiment of the present invention. The digital photographing apparatus according to the current embodiment may have a scene mode selecting function, and a user may select a scene mode of the digital photographing apparatus by manipulating a key or the like of the manipulation unit 200. Electrical signals output by the manipulation unit 200 are transmitted to the CPU 100, and thus the CPU 100 can control the digital photographing apparatus according to the electrical signals.

Having a scene mode selecting function means having a function allowing a user to select a scene mode from among an indoor mode, a landscape mode, a portrait mode, a close-up mode, and/or a still-life mode. Of course, the photographing apparatus according to the current embodiment is not limited to a photographing apparatus that allows selection of one scene mode from among the indoor mode, the landscape mode, the portrait mode, the close-up mode, and/or the still-life mode. In other words, various modifications, such as cases where the number of scene modes from which a scene mode can be selected may be less than or greater than that in the current embodiment and where the types of scene modes from which a scene mode can be selected may be different from those in the current embodiment, may be made.

The scene mode has a function that improves the convenience of users by automatically changing or setting set-up values of a digital photographing apparatus, such as, an exposure degree, a color, etc., required by a specific subject and/or under a specific photographing circumstance. For example, in a portrait mode, since users typically prefer an out-focusing effect (shallow depth-of-field) where a person appears relatively clearer than subjects around the person, the digital photographing apparatus is set so that an aperture stop is open (i.e., so that the value of the aperture stop decreases) in order to obtain the out-focusing effect.

Of course, if the digital photographing apparatus has a face recognition function, the digital photographing apparatus may allow the face recognition function to be performed when a portrait mode is selected. For example, in a close-up mode, near-distance photography can be performed by allowing application of a macro setup in order to bring a near-distance subject into focus. These functions are only examples, and various other settings of scene mode functions may be applied to the digital photographing apparatus.

FIG. 10 illustrates even a configuration which is a feature of a lens-interchangeable digital photographing apparatus and of which a description has been omitted in the previous embodiments. The interchangeable lens unit 10' includes the aperture stop 20, the aperture stop driving unit 21, the zooming lens 13, the lens location detection unit 14, the lens control unit 15, the focusing lens 16, and/or the focusing lens driving unit 17. The zooming lens 13 is required when the interchangeable lens unit 10' has a zooming function. Thus, when the interchangeable lens unit 10' does not have the zooming function, the zooming lens 13 may not be included in the interchangeable lens unit 10.

The aperture stop 20 is operated by the aperture stop driving unit 21, which is controlled by an aperture stop control unit 26 of the digital photographing apparatus, and controls the amount of light.

The lens location detection unit 14 includes an encode plate (not shown) in which a plurality of code patterns are formed at intervals of a predetermined pitch in an optical-axis direction within a movement range of the zooming lens 13, and an encoder brush (not shown) that moves integrally with a lens barrel (not shown) while slidably contacting the encode plate. The lens location detection unit 14 detects the degree of movement of the zooming lens 13. Of course, various modifications, such as a case where the lens location detection unit 14 also detects the location of the focusing lens 16, may be made to the lens location detection unit 14, which is in contrast with what is illustrated in FIG. 10.

The lens control unit 15 may include a memory unit (not shown) that includes, for example, a ROM for storing a control program or a flash memory for storing data about state information. The lens control unit 15 may further include a communication unit (not shown) that performs communications between the lens control unit 15 and the CPU 100. The communication unit may transmit state information data such as a focal distance, an aperture stop value, a focusing distance, and/or a peripheral light amount of the interchangeable lens unit 10' to the CPU 100, and may receive, for example, data about the amount of driving of the focusing lens 16 from the CPU 100.

During photography, data such as a focal distance and an aperture stop value of the interchangeable lens unit 10' after completion of an AF operation may be transmitted from the communication unit of the lens control unit 15 to the CPU 100. The memory unit of the lens control unit 15 may store, for example, data about the state information of the zooming lens 13 and/or the focusing lens 16 or the data about the amount of driving of the focusing lens 16, which has been received from the CPU 100.

The focusing lens driving unit 17 includes, for example, a helicoid (not shown) and a gear (not shown) for rotating the helicoid, and moves either the focusing lens 16 or both of the focusing lens 16 and the zooming lens 13 under the control of a focusing control unit 25 of the digital photographing apparatus.

The structure of the interchangeable lens unit 10' described above with reference to FIG. 10 is only an example, and various other lens units may be used.

When the digital photographing apparatus having the interchangeable lens unit 10' installed therein is in the photographing mode, as an electrical signal generated by a user is applied to the CPU 100, the CPU 100 analyzes the electrical signal and controls the aperture stop control unit 26, the focusing control unit 25, a mirror control unit 23, a shutter control unit 24, and/or an image sensor control unit 31 according to the electrical signal. Accordingly, the degree of openness of the aperture stop 11, locations of the lenses 13 and 16, sensitivity of the image sensor 30, and the like are controlled.

When photography is performed by the user, the mirror control unit 23 and the shutter control unit 24 drive a mirror unit 21 and a shutter 22, respectively, so that light passed through the interchangeable lens unit 10' can be incident upon the image sensor 30.

As described above, FIG. 2 illustrates a temporary image obtained by photographing a person sitting on a sofa by using the digital photographing apparatus having a Schneider D-XENON 12~24 mm F4 lens installed therein. More specifically, FIG. 2 illustrates a temporary image obtained by photographing a person sitting on a sofa in an indoor mode by using the digital photographing apparatus having a Schneider D-XENON 12~24 mm F4 lens installed therein.

A lens suitability determination unit 93 determines whether a lens currently installed in the digital photographing apparatus is suitable for a selected scene mode. In the case of FIG. 2, an indoor mode is selected and the currently installed lens is suitable for landscape photography, and thus the lens suitability determination unit 93 may determine that the installed lens is unstable for a current photographing circumstance. If the lens suitability determination unit 93 determines that the installed lens is unsuitable, a notice informing that the current installed lens is unsuitable is displayed on a display unit 80 so that users can recognize that the currently installed lens is not suitable for the selected scene mode.

Figure 11:
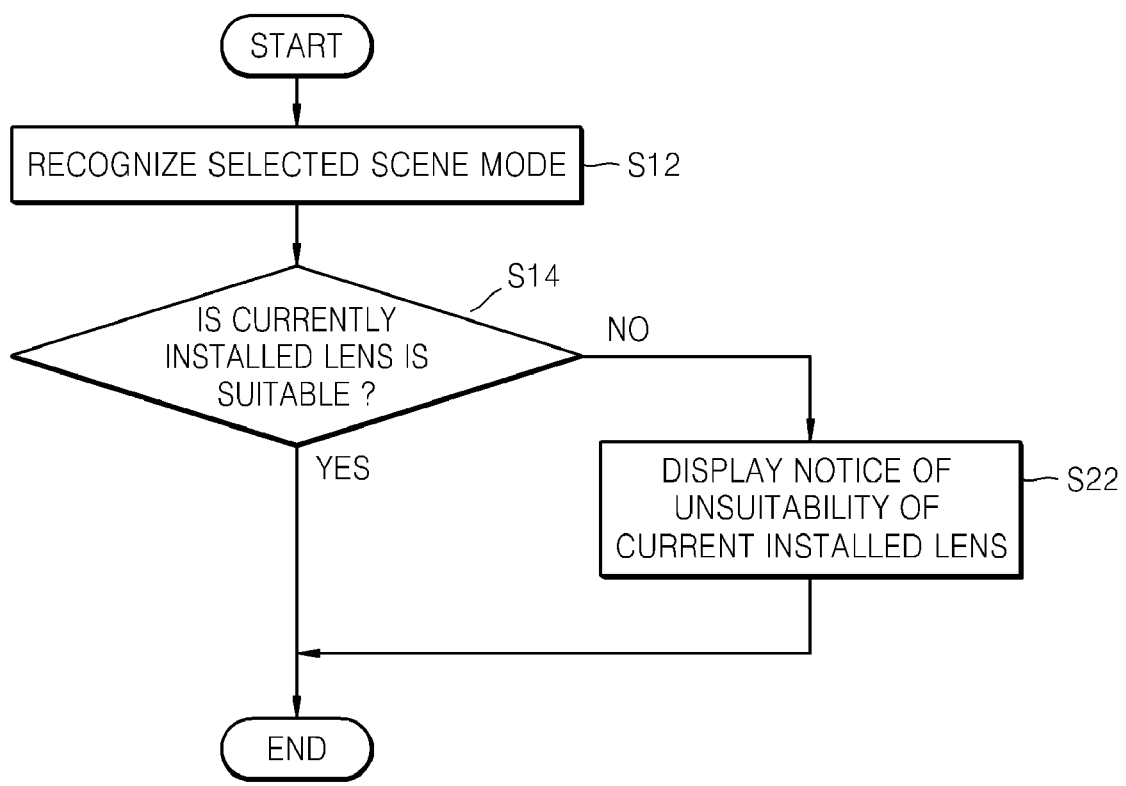
FIG. 11 is a flowchart illustrating a method of controlling a digital photographing apparatus, according to another embodiment of the present invention.

FIG. 11 is a flowchart illustrating a method of controlling a digital photographing apparatus, according to another embodiment of the present invention.

Referring to FIG. 11, first, a selected scene mode is recognized in operation S12, and suitability or unsuitability of a currently installed lens is then determined in operation S14. If it is determined that the currently installed lens is unsuitable, a notice informing that the current installed lens is unsuitable is displayed on a display unit, in operation S22. Accordingly, even inexperienced users can easily recognize that a lens unstable for the selected scene mode is currently installed in the digital photographing apparatus.

Figure 12:
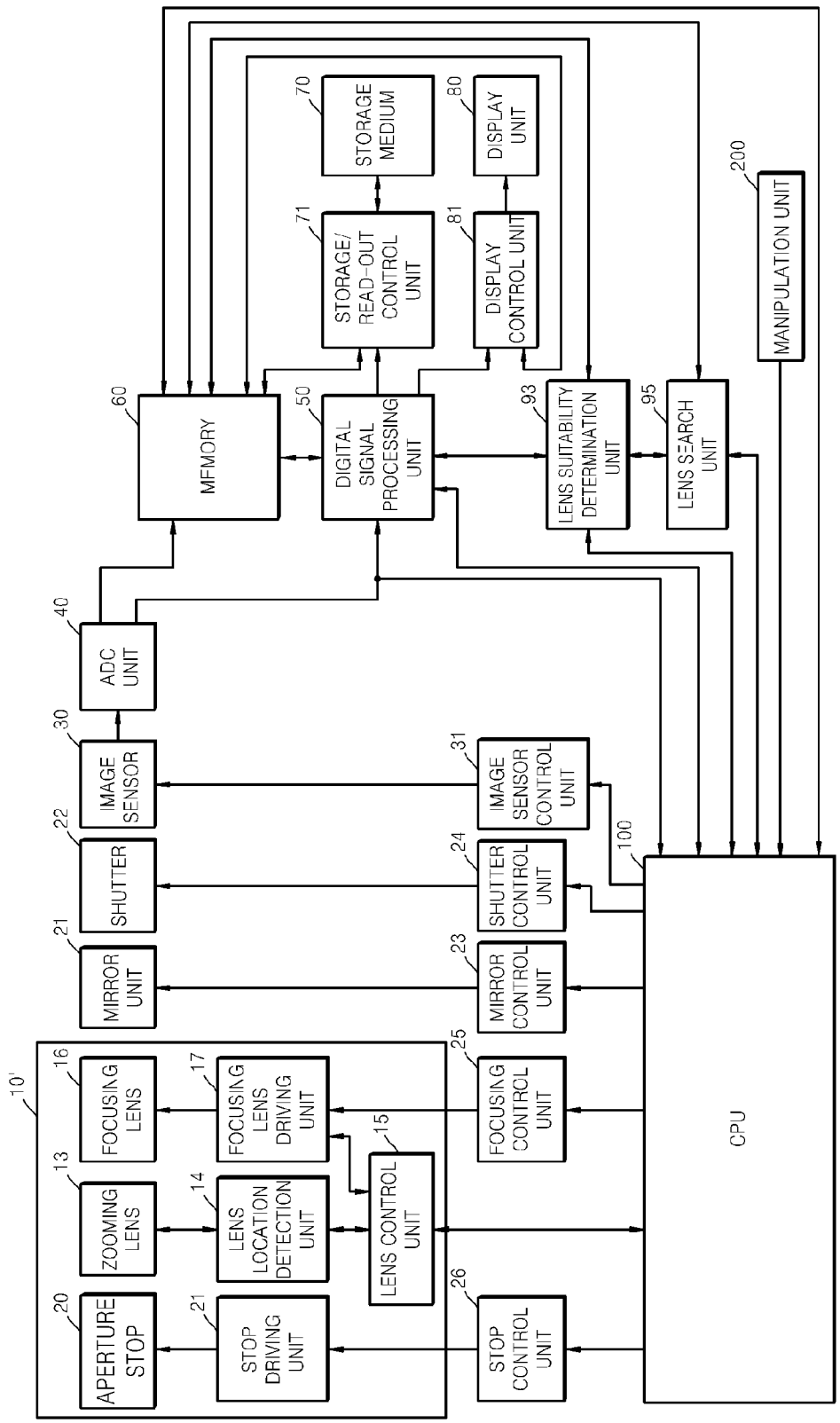
FIG. 12 is a block diagram of a digital photographing apparatus according to another embodiment of the present invention.

FIG. 12 is a block diagram of a digital photographing apparatus according to another embodiment of the present invention.

The digital photographing apparatus according to the current embodiment further includes a lens search unit 95 in contrast with the digital photographing apparatus of FIG. 10. The lens search unit 95 searches for lenses suitable for a selected scene mode. In other words, if the lens suitability determination unit 93 determines that the currently installed lens is unsuitable for the selected scene mode, the digital photographing apparatus according to the current embodiment recommends a preferable lens or preferable lenses for the selected scene mode from among the lenses found by the lens search unit 95 by displaying the most suitable lens on the display unit 80.

Although it is illustrated in FIG. 12 that the lens suitability determination unit 93 and the lens search unit 95 are separate components and are also distinguished from the other components, this configuration is only an example. In other words, various modifications, such as a case where at least one of the lens suitability determination unit 93 and the lens search unit 95 may be a part of another component such as the CPU 100 or the digital signal processing unit 50, may be made to the configuration of FIG. 12.

For example, as illustrated in FIG. 2, when the indoor mode is selected, the lens search unit 95 may find a Schneider D-XENON 18~55 mm F3.5~5.6 AL lens, a Schneider D-XENON 16~45 mm F4 ED lens, and/or a Schneider D-XENON 35 mm F2 lens as lenses suitable for a current photographing circumstance (see Table 1). Accordingly, the digital photographing apparatus displays the lenses suitable for the current photographing circumstance on the display unit 80 so that even inexperienced users, who are unable to figure out what lens is suitable for each photographing circumstance, can effectively perform photographing by using a lens suitable for a given photographing circumstance.

The display of the found suitable lenses on the display unit 80 may be the display of images of the suitable lenses on the display unit 80 or the display of focal distances and minimum aperture stop values of the suitable lenses on the display unit 80. Alternatively, if specific names have been assigned to the suitable lenses, the specific names may be displayed on the display unit 80. However, if the lens search unit 95 has found no suitable lenses, a process may be concluded without displaying the suitable lenses on the display unit 80. The process denotes a process of recommending a lens or lenses. In other words, the process does not denote the other processes, such as, a process of obtaining data about an image from a subject.

An information transmission unit for transmitting data about characteristics and the like of a lens possessed by a user is attached to the lens possessed by the user, and the lens search unit 95 includes an information receiving unit. In this structure, when the lens search unit 95 searches for lenses suitable for a selected scene mode, the lens search unit 95 may acquire information from the information transmission unit attached to the lens possessed by the user and search for the suitable lenses from lenses indicated by the acquired information. In this regard, an RFID tag and an RFID reader as described above in the previous embodiments may be used. Of course, various modifications, such as a case where information transfer between the lens and the lens search unit 95 may be performed via wireless communications such as Zigbee, Bluetooth, or WiFi, may be made.

Alternatively, as described above in the previous embodiments, a list of lenses may be previously input to the digital photographing apparatus by the user, and if the lens suitability determination unit 93 determines that the installed lens is unsuitable, the lens search unit 95 may search for lenses suitable for a current photographing circumstance from the previously-input lenses. In this way, various modifications may be made to a way of acquiring lenses from which suitable lenses are to be searched for.

The previous input of the lens list by a user may be performed in such a way that a list of useable lenses is stored in the memory of the digital photographing apparatus, the user selects at least some lenses from the list of useable lenses, and data about the selected lenses is stored in the memory. Thereafter, the digital photographing apparatus may search for and/or recommend the lenses suitable for the current photographing circumstance by using the selected lens data stored in the memory.

The following Table 2 shows a case where three lenses have been previously selected by a user. In order for a digital photographing apparatus to recommend lenses, a lens list itself as shown in the following Table 2 may be displayed on a display unit, or only suitable lenses stored in the memory from among lenses possessed by a user may be displayed thereon, or all of suitable lenses may be displayed regardless of whether the lenses are possessed by the user and lenses possessed by the user from among the suitable lenses may be displayed together with an indication saying that the lenses are possessed by the user. In this way, various modifications may be made to the way of displaying.

TABLE 2

Exemplary Lens Selection by a User

| Scene mode | Recommended lenses | Possessed lenses |
|---|---|---|
| Indoor | Schneider D-XENON 18~55 mm F3.5~5.6 AL | |
| | Schneider D-XENON 16~45 mm F4 ED | |
| | Schneider D-XENON 35 mm F2 | |
| Landscape | Schneider D-XENON 18~55 mm F3.5~5.6 AL | ○ |
| | Schneider D-XENON 50~200 mm F4~5.6 ED | |
| | Schneider D-XENON 12~24 mm F4 ED | |
| | Schneider FISH-EYE 10~17 mm F3.5~4.5 ED | |
| | Tamron AF 18~200 mm F3.5~6.3 XR Di II LD Aspherical(IF)Macro | |
| | Sigma 18~200 mm F3.5~6.3 DC | |
| Portrait | Sigma APO 70~200 mm F2.8 EX DG MACRO HSM | ○ |
| | Schneider FISH-EYE 10~17 mm F3.5~4.5 ED | |
| | Schneider D-XENON Macro 100 mm F2.8 | |
| | Pentax D FA 77 mm F1.8 Limited | |
| Close-up photography | Tamron AF 18~200 mm F3.5~6.3 XR Di II LD Aspherical(IF)Macro | |
| | Sigma 18~200 mm F3.5~6.3 DC | |
| | Pentax D FA Macro 50 mm F2.8 | ○ |
| | Schneider D-XENON Macro 100 mm F2.8 | |
| Still-life photography | Sigma APO 70~200 mm F2.8 EX DG MACRO HSM | |
| | Pentax D FA Macro 50 mm F2.8 | |
| | Schneider D-XENON Macro 100 mm F2.8 | |

Figure 13:
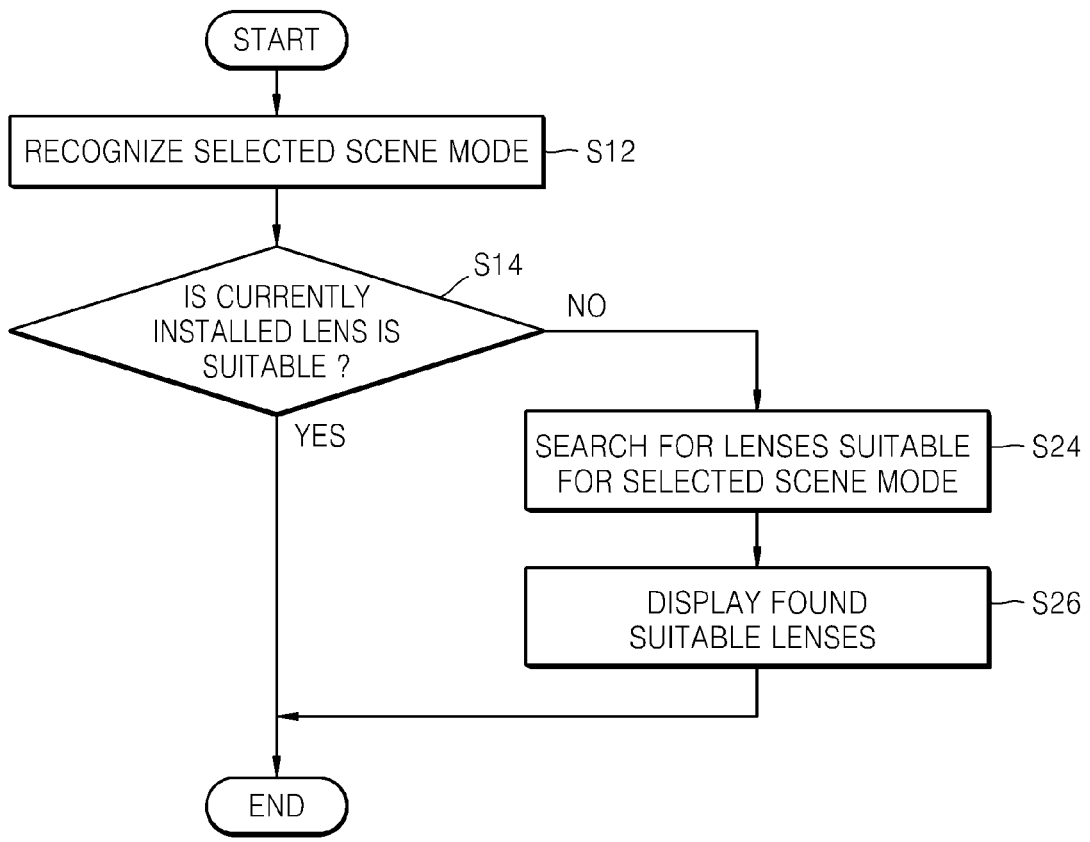
FIG. 13 is a flowchart illustrating a method of controlling a digital photographing apparatus, according to another embodiment of the present invention.

FIG. 13 is a flowchart illustrating a method of controlling a digital photographing apparatus, according to another embodiment of the present invention. Referring to FIG. 13, first, a selected scene mode is recognized in operation S12, and suitability or unsuitability of a currently installed lens is then determined in operation S14. If it is determined in operation S14 that the currently installed lens is unsuitable, lenses suitable for the selected scene mode are searched for in operation S24, and found suitable lenses are displayed on a display unit in operation S26.

Accordingly, even inexperienced users can easily perform photography by using the most suitable lens for the selected scene mode. The display of the found suitable lenses on the display unit may be the display of images of the suitable lenses on the display unit or the display of focal distances and minimum aperture stop values of the suitable lenses on the display unit. Alternatively, if specific names have been assigned to the suitable lenses, the specific names may be displayed on the display unit. However, if no suitable lenses have been found in operation S24, a process may be concluded without undergoing the operation S26 of displaying the suitable lenses on the display unit. The process denotes a process of recommending a lens or lenses. In other words, the process does not denote the other processes, such as, a process of obtaining data about an image from a subject.

Of course, in contrast with what is illustrated in FIG. 13, if it is determined in operation S14 that the currently installed lens is unsuitable, after the operation S24 of searching for lenses suitable for the selected scene mode, an operation of inquiring of a user whether the found suitable lenses are to be displayed on the display unit may be performed before the operation S26 of displaying the found suitable lenses on the display unit.

Accordingly, if the user wants the found suitable lenses to be displayed on the display unit, the operation S26 of displaying the found suitable lenses on the display unit may be performed. Alternatively, if it is determined in operation S14 that the currently installed lens is unsuitable, an operation of informing the user of unsuitability of the currently installed lens by using the display unit may be performed before the operation S24 of searching for lenses suitable for the selected scene mode. In the operation of informing the user of the unsuitability of the currently installed lens, a user may be inquired whether suitable lenses are to be searched for and/or displayed on the display unit, and if the user selects a search and/or display of the suitable lenses, the operation S24 of searching for lenses suitable for the selected scene mode and the operation S26 of displaying the found suitable lenses on the display unit may be performed. In this way, various modifications may be made.

The operation S24 of searching for lenses suitable for the selected scene mode may be an operation of searching for suitable for the selected scene mode from the lenses previously input by a user. Alternatively, if the digital photographing apparatus includes an RFID reader, the operation S24 of searching for lenses suitable for the selected scene mode may be an operation of acquiring information from RFID tags attached to the lenses possessed by a user through the RFID reader and searching for lenses suitable for the selected scene mode from lenses indicated by the acquired information.

The operation S24 of searching for lenses suitable for the selected scene mode may include the sub-operations of searching for the lenses possessed by the user and searching for lenses suitable for the selected scene mode from the lenses possessed by the user. The operation S14 of determining whether the currently installed lens is unsuitable may be an operation of determining the suitability or unsuitability of the currently installed lens and/or searching for suitable lenses on the basis of such a criterion as shown in Table 1.

The digital photographing apparatus controlling methods according to the above-described embodiments and modifications thereof may be stored in the form of programs that can be performed in digital photographing apparatuses, in a recording medium. The recording medium may be the storage medium 70 of FIG. 1, the memory 60 of FIG. 1, or other separate recording media. Examples of the recording media include read-only memory (ROM), random-access memory (RAM), CD-ROMs, hard disks, floppy disks, flash memory, digital versatile discs (DVD), and so on. Moreover, the recording medium may be the CPU 100 of FIG. 10 or a part of the CPU 100.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. Numerous modifications and adaptations will be readily apparent to those skilled in this art without departing from the spirit and scope of the present invention.

What is claimed is:

1. A method of controlling a lens-interchangeable digital photographing apparatus, the method comprising:
    acquiring a temporary image using a first lens which is installed on the lens-interchangeable digital photographing apparatus in response to a signal from a user;
    producing additional temporary images that could be acquired using respective lenses other than the first lens, by processing the acquired temporary image;
    displaying the temporary image and the additional temporary images on a display unit; and
    searching lenses that the user possesses.

2. The method of claim 1, wherein the searching of the lenses that the user possesses comprises searching a list of lenses that was previously input by the user.

3. A lens-interchangeable digital photographing apparatus comprising:
    an image data acquiring unit that acquires image data or temporary image data using a first lens which is installed on the lens-interchangeable digital photographing apparatus;
    a corrected temporary image data acquiring unit to acquire additional temporary image data corresponding to an additional temporary image that could be acquired using respective lenses other than the first lens, by processing the temporary image data acquired by the image data acquiring unit;
    a display unit to display an image; and
    a lens search unit to search lenses that a user possesses.

4. The lens-interchangeable digital photographing apparatus of claim 3, wherein,
    if a focal distance of each of the lenses searched by the lens search unit is greater than a focal distance of the first lens that is used when the image data acquiring unit acquires the temporary image data, then the additional temporary image acquiring unit acquires the additional temporary image data associated with the additional temporary image obtained by cropping and magnifying a part of a temporary image corresponding to the temporary image data; and
    if the focal distance of each of the lenses searched by the lens search unit is less than the focal distance of the first lens that is used when the image data acquiring unit acquires the temporary image data, then the additional temporary image acquiring unit acquires the additional temporary image data associated with the additional temporary image obtained by reducing a temporary image corresponding to the temporary image data.

5. The lens-interchangeable digital photographing apparatus of claim 3, wherein the lens search unit is configured to search a list of lenses that was previously input by the user.

6. The lens-interchangeable digital photographing apparatus of claim 3, wherein the lens search unit comprises an information receiving unit in order to acquire information from information transmission units attached to the lenses possessed by the user.

7. The lens-interchangeable digital photographing apparatus of claim 6, wherein the information receiving unit has a radio frequency identification (RFID) reader and the information transmission unit has an RFID tag.

8. The lens-interchangeable digital photographing apparatus of claim 3, wherein the image data acquiring unit is to acquire the temporary image data when a shutter of the lens-interchangeable digital photographing apparatus is in a half-shutter state.

9. The lens-interchangeable digital photographing apparatus of claim 3, wherein:
    if the focal distance of each of the lenses searched by the lens search unit is greater than the focal distance of the first lens used when the image data acquiring unit acquires the temporary image data, then the additional temporary image acquiring unit acquires the additional temporary image data associated with the additional temporary image that is obtained by cropping and magnifying a residual part of a temporary image that remains after removing a part corresponding to a central subject from the temporary image corresponding to the temporary image data and by combining the result of the cropping and magnification of the residual part with the part corresponding to the central subject in the temporary image corresponding to the temporary image data; and if the focal distance of each of the lenses searched by the lens search unit is less than the focal distance of the first lens used when the image data acquiring unit acquires the temporary image data, then the additional temporary image acquiring unit acquires the additional temporary image data associated with the additional temporary image that is obtained by reducing the residual part of a temporary image that remains after removing the part corresponding to the central subject from the temporary image corresponding to the temporary image data and by combining the result of the reduction of the residual part with the part corresponding to the central subject in the temporary image corresponding to the temporary image data.

\* \* \* \* \*